US012743278B2

(12) United States Patent
Korpas et al.

(10) Patent No.: US 12,743,278 B2
(45) Date of Patent: Sep. 22, 2026

(54) SYSTEMS AND METHODS FOR FEDERATED COMPUTER PROCESSING ARCHITECTURE AND COORDINATED BROADCAST DATA MESSAGING

(71) Applicant: HSBC GROUP MANAGEMENT SERVICES LIMITED, London (GB)

(72) Inventors: Georgios Korpas, Singapore (SG); Jeremy Kulcsar, Hong Kong (HK); Vyacheslav Kungurtsev, Prague (CZ); William Shoosmith, London (GB)

(73) Assignee: HSBC GROUP MANAGEMENT SERVICES LIMITED, London (GB)

( * ) Notice: Subject to any disclaimer, the term of this patent is extended or adjusted under 35 U.S.C. 154(b) by 47 days.

(21) Appl. No.: 19/007,112

(22) Filed: Dec. 31, 2024

(65) Prior Publication Data

US 2025/0130800 A1 Apr. 24, 2025

(30) Foreign Application Priority Data

Dec. 20, 2024 (GR) .............................. 20240100910

(51) Int. Cl.
*G06F 9/30* (2018.01)
*G06N 7/01* (2023.01)

(52) U.S. Cl.
CPC ........... *G06F 9/30036* (2013.01); *G06N 7/01* (2023.01)

(58) Field of Classification Search
CPC .............................. G06F 9/30036; G06N 7/01
USPC .......................................................... 709/201
See application file for complete search history.

(56) References Cited

U.S. PATENT DOCUMENTS 11,238,278 B1 * 2/2022 Swanson .................. G06N 3/08
2022/0383114 A1 * 12/2022 Ghazvinian Zanjani .................... G06N 3/0464

FOREIGN PATENT DOCUMENTS

| | | | | | |
|---|---|---|---|---|---|
| CN | 105898691 | A | * | 8/2016 | H04W 84/18 |
| CN | 117527323 | A | * | 2/2024 | H02J 13/12 |
| CN | 118101929 | A | * | 5/2024 | H04N 19/179 |
| CN | 118673470 | A | * | 9/2024 | G06F 18/213 |
| CN | 118982018 | A | * | 11/2024 | G06N 3/088 |
| CN | 119514539 | A | * | 2/2025 | G06F 17/16 |
| CN | 121444125 | A | * | 1/2026 | G06T 7/162 |
| WO | WO-2024081177 | A1 | * | 4/2024 | G06N 3/08 |

* cited by examiner

*Primary Examiner* — David P Zarka
(74) *Attorney, Agent, or Firm* — Dentons Durham Jones Pinegar

(57) ABSTRACT

Embodiments of the present disclosure relate to a network of federated computing nodes in which a cost matrix is distributed. Each node has stored thereon distribution vectors, and create an optimal transportation transfer function using the Sinkhorn-Knopp theorem. In other words, the nodes are each configured to generate updated distribution vectors using the cost matrix shared amongst the nodes and their own distribution vectors. The updated distribution vectors of every node is thereafter used to create the optimal transportation transfer function by concatenating the updated distribution vectors received from each node. This approach can be centralized in a star-network architecture, or in a peer-to-peer-network architecture. Furthermore, the approach may be synchronous or asynchronous depending on the implementation.

20 Claims, 19 Drawing Sheets

500

600

SYSTEMS AND METHODS FOR FEDERATED COMPUTER PROCESSING ARCHITECTURE AND COORDINATED BROADCAST DATA MESSAGING

CROSS-REFERENCE TO RELATED APPLICATIONS

This application claims priority to and the benefit of Greece Patent Application No. 20240100910, filed Dec. 20, 2024, the contents of which is incorporated into the present application by reference.

FIELD

The present application relates to computer architecture for computer network and more specifically, to systems and methods for federated computer processing architecture and coordinated broadcast data messaging across a network of distributed computing resources.

INTRODUCTION

Computers have difficulty with the availability of computing resources when faced with large quantities of data to process, due to technical limitations in terms of computational power, storage space, and memory. To optimize the performance and functioning of the computer, computer architectures can be engineered to maximize central processing unit (CPU) and graphics processing unit (GPU) contribution, to some extent. These limitations become more readily apparent when matrix calculations have an extremely large level of dimensionality, such as for data science computations.

Another way to optimize the computational power is to distribute the computation across a network of computing nodes. By sharing the computational load across the network, the computation time diminishes as a function of the number of nodes. In some applications, however, load distribution is not possible due to the confidentiality of the data. While cryptography may be a solution to maintain privacy, the encrypting and decrypting operations themselves adds to the total computation load.

SUMMARY

An improved approach for federated computer processing architecture and coordinated broadcast data messaging is proposed herein, in which a large data object representing a complex computing problem is addressed using a combination of local processing to generate local updates for broadcast and coordinated iterative processing based at least on updates received from counterparty nodes. Different variations are proposed herein, including different topologies, such as a star topology, a peer to peer topology, and variations thereof, and different coordination approaches, such as synchronous, asynchronous, and combination asynchronous/synchronous). The approach is practically implemented on distributed computing hardware, which can include virtualized computing resources, and supervisory/hypervisor computing processes that coordinate computing activities as between each of the distributed computing hardware. As described herein, the approaches provide practical solutions to technical problems relating to computing privacy, an inability to have direct communications of sensitive information, as well as overcoming practical limitations in computing resources when conducting extremely high complexity (e.g., high dimensionality) computing. The computing devices can be remote from one another and communicate either to a centralized computing device which is configured to broadcast updates in a coordinated manner across all of the "worker" computing devices, or in another variation, each device is coupled to one another and they configured to broadcast in a "peer to peer" manner. Corresponding control methods are proposed that operate on the computing nodes to implement the broadcast/update coordination approach, which can be practically implemented as software processes operating on computing hardware that operate as separate computing nodes. In a centralized topology approach, one or more central servers are utilized in primary/secondary configuration with computing nodes, and the one or more central servers could simply be assigned from a selected subset of the available computing nodes, the one or more central servers receiving updates and broadcasting the coordinated set of updates at each iteration. The computing is conducted iteratively (in the asynchronous variation, the iterations for a particular node can operate free of updates from other nodes in an attempt to improve computational performance with the technical tradeoff of potentially increased divergence), and the computing is conducted until either a convergence criterion is met (e.g., the outputs have stabilized between a particular threshold of acceptable ranges), or a maximum number of iterations have been met. The final output is a data object representing the final state of the updates on the large data object (e.g., a large matrix being updated), and in the final output data object can then be provided to control downstream computing operations, such as controlling data routing of data messages, modifying data fields of stored data objects in accordance with the large data object, among others.

Embodiments of the present disclosure relate to a network of federated computing nodes in which a cost matrix is distributed and portioned for coordinated local computing by individual nodes which are configured to operate as an ordered combination to broadcast updates for iterative computing where outputs from each of the other individual nodes may have downstream impacts on a next iteration of local updates by the computing node. Each node has stored thereon distribution vectors and create an optimized transportation plan using the Sinkhorn-Knopp computing approach. A transportation plan is a type of data object that operates as a transfer function between one probability distribution to another probability distribution, and this is updated based on local updates at each iteration. In other words, the nodes are each configured to generate updated distribution vectors using the cost matrix shared amongst the nodes and their own distribution vectors. The updated distribution vectors of every node is thereafter used to create the optimal transportation plan by concatenating the cost matrix with the updated distribution vectors. This approach can be centralized in a star-network architecture, or in a peer-to-peer-network architecture. Furthermore, the approach may be synchronous or asynchronous depending on the implementation.

Furthermore, the beneficial factor of the Sinkhorn-Knopp computing approach is that the solution can be obtained without exchanging raw data, namely the initial distribution vectors, and instead broadcasting intermediate determinations which do not include the raw data but are determinations derived therefrom, thereby safekeeping data privacy of every node.

From a technical perspective, the approach can be used for a number of different technical use cases, including privacy-enhanced distributed computing, distributed computing for decomposing large matrices that would otherwise be infeasible to compute. The technical effect of the federated approach proposed herein is that a large computing operation can be broken down into smaller portions for iterative computing by individual computing nodes whose activities are coordinated as between one another through shared updates, either in a peer to peer approach or based on centralized control at one or more control servers. For example, a matrix may be so large (e.g., for high dimensional machine learning) that it exceeds the computing capability of a single computer due to technical limitations from storage, memory, or processing resources. The approaches proposed herein assist with overcoming these computing architecture and performance limitations by using a federated approach to coordinated distributed computing.

From a practical perspective, the approach can be used for situations where, for regulatory reasons or technical limitations, devices are not permitted to communicate sensitive information directly with one another but need to coordinate in a limited fashion, such as when geographically disparate financial exchange systems are attempting to avoid risk free price arbitrage by opportunistic algorithmic traders. For a geographically distributed organization, this approach can also be used for group-level reporting and calculations were similarly, there may be process restrictions for inter-group computing system communications. Thus, federated computer processing architecture continues to improve processing of shared computational load while maintaining privacy of the data.

In accordance with a broad embodiment, there is disclosed a decentralized system for coordinated processing across a federated computer processing architecture using coordinated broadcast data messages between a plurality of computing nodes. The system includes the plurality of computing nodes connected via at least one communications network, the plurality of computing nodes being configured for electronic communication over the communication network, each computing node having a computer processor, operating in conjunction with a computer memory and non-transitory computer readable storage media, the computer memory storing a pair of local probability distribution vectors representative of local data and a shared matrix data object representative of an assigned portion of a global matrix data object, each computing node of the plurality of computing nodes configured to process a method for generating an optimal transportation matrix data object. The method includes initializing a portion of a first global probability distribution vector, the portion having a size corresponding to the size of the local probability distribution vectors, generating a first local updated probability distribution vector by normalizing one of the local probability distribution vectors with a product of the shared matrix data object and the portion of the first global probability distribution vector, broadcasting, via the communication network, the first local updated probability distribution vector to the other computing nodes, receiving, via the communication network, a plurality of first shared updated probability distribution vectors from the other computing nodes, generating a second global probability distribution vector by concatenating the generated first local updated probability distribution vector and the received first shared updated probability distribution vectors, initializing a portion of the second global probability distribution vector, the portion of the second global probability distribution vector having a size corresponding to the size of the local probability distribution vectors, generating a second local updated probability distribution vector by normalizing the other one of the local probability distribution vector with a product of a transpose of the shared matrix data object and the portion of the second global probability distribution vector, broadcasting, via the communication network, the second local updated probability distribution vector to the other computing nodes, receiving, via the communication network, a plurality of second shared updated probability distribution vectors from the other computing nodes, generating a third global probability distribution vector by concatenating the generated second local updated probability distribution vector and the received second shared updated probability distribution vectors, generating the optimal transportation matrix data object by scaling the global matrix data object with a first matrix data object of which the diagonal is the second global probability distribution vector and a second matrix data object of which the diagonal is third second global probability distribution vector and providing the optimal transportation matrix data object to the other computing nodes.

In some embodiments, each computing node is further configured, in a previous iteration, to receive, via the communication network and from at least one other computing node, a previously updated probability distribution vector and to generate the first global probability distribution vector by concatenating the received previously updated probability distribution vectors.

In some embodiments, prior to said providing each other computing nodes with the portion of the first global probability distribution vector, each computing node is further configured to hold until the previously updated probability distribution vector is obtained from each other computation node.

In some embodiments, each computing node is further configured to provide a given computing with the portion of the first global probability vector upon a reception of a previously updated probability distribution vector from the given computing node.

In some embodiments, each computing node is configured to iteratively reprocess the method for generating the optimal transportation matrix data object using the third global probability distribution vector as the first global probability distribution vector until the optimal transportation matrix data object has a marginal value is inferior to a predetermined threshold.

In some embodiments, each computing node is further configured to normalize the global matrix data object with an entropy regularization term, the entropy regularization term selected to improve a convergence of the marginal value of the optimal transportation matrix data object towards the predetermined threshold.

In some embodiments, each computing node is configured, upon reception of the optimal transportation matrix data object to combine one of the local probability distribution vectors with optimal transportation matrix data object to retrieve an optimized distribution vector.

In some embodiments, each computing node has stored thereon a plurality of local probability distribution vectors to be processed for generating the optimal transportation matrix data object.

In some embodiments, the computer processor of each computing node include a combination of both central processing units and graphics processing units, further wherein the plurality of computing nodes are networked distributed computing resources that are selected and provisioned for usage based at least on the generation of the optimal transportation matrix data object by distributing the computation load across the plurality of computing nodes.

In some embodiments, said initializing the portion of the first global probability vector includes slicing the first global probability vector to obtain the portion of the first global probability vector, further wherein said initializing the portion of the second global probability vector includes slicing the second global probability vector to obtain the portion of the second global probability vector.

In accordance with another broad embodiment, there is disclosed a centralized system for coordinated processing across a federated computer processing architecture using coordinated broadcast data messages between a plurality of computing nodes. The system comprises a server computer configured for electrical connection and communication via at least one communications network, the server computer having computer memory storing a global matrix data object and a first global probability distribution vector and the plurality of computing nodes connected via the at least one communications network, the plurality of computing nodes being configured for electronic communication over the communication network, each computing node having a computer processor, operating in conjunction with a computer memory and non-transitory computer readable storage media, the computer memory storing a pair of local probability distribution vectors representative of local data, the server computer configured to process a method for generating an optimal transportation matrix data object. The method comprises providing, via the communication network, each computing node with a first product vector representative of a product between the first global probability distribution vector and the global matrix data object, the product vector having a size corresponding to the size of the local probability distribution vectors, receiving, via the communication network and from each computing node, a first updated probability distribution vector, wherein each first updated probability distribution vector is generated by a respective computing node by normalizing one of the local probability distribution vectors with the first product vector, generating a second global probability distribution vector by concatenating the received first updated probability distribution vectors, providing, via the communication network, each computing node with a second product vector representative of the second global probability distribution vector being multiplied with the global matrix data object, receiving, via the communication network and from each computing node, a second updated probability distribution vector, wherein each second updated probability distribution vector is generated by a respective computing node by normalizing the other one of the local probability distribution vector with the second product vector, generating a third global probability distribution vector by concatenating the received second updated probability distribution vectors, generating the optimal transportation matrix data object by scaling the global matrix data object with a first matrix data object of which the diagonal is the second global probability distribution vector and a second matrix data object of which the diagonal of the third global probability distribution vector and providing the optimal transportation matrix data object to each computing node.

In some embodiments, the server is further configured, in a previous iteration, to receive, via the communication network and from at least one computing node, a previously updated probability distribution vector and to generate the first global probability distribution vector by concatenating the received previously updated probability distribution vectors.

In some embodiments, prior to said providing each computing node with the first product vector, the server is further configured to hold until the previously updated probability distribution vector is obtained from each computation node. 14. The system of claim 11, wherein the server is configured to iteratively reprocess the method for generating the optimal transportation matrix data object using the third global probability distribution vector as the first global probability distribution vector until the optimal transportation matrix data object has a marginal value is inferior to a predetermined threshold.

In some embodiments, the server is further configured to normalize the global matrix data object with an entropy regularization term, the entropy regularization term selected to improve a convergence of the marginal value of the optimal transportation matrix data object towards the predetermined threshold.

In some embodiments, each first product vector is obtained, by each computing node, as a result of the server performing the steps of receiving, from each computing node, a previously updated probability distribution vector, concatenating the updated probability distribution vectors to obtain the first global probability distribution vector, multiplying the first global probability distribution vector with the global matrix data object, thereby obtaining a first intermediate global vector and scattering the first intermediate global vector amongst each computing node.

In some embodiments, each node is configured, upon reception of the optimal transportation matrix data object, to combine one of the local probability distribution vectors with optimal transportation matrix data object to retrieve an optimized distribution vector.

In some embodiments, each node has stored thereon a plurality of local probability distribution vectors to be processed for generating the optimal transportation matrix data object.

In some embodiments, the computer processor of each computing node include a combination of both central processing units and graphics processing units, further wherein the plurality of computing nodes are networked distributed computing resources that are selected and provisioned for usage based at least on the generation of the optimal transportation matrix data object by distributing the computation load across the plurality of computing nodes.

In accordance with another broad embodiment, there is disclosed a non-transitory computer readable medium storing machine interpretable instruction sets, which when executed by a processor, cause the processor to perform steps of a method for coordinated broadcast data messaging. The method includes providing, via a communication network, each computing node of a plurality of computing nodes with a first product vector representative of a portion of a product between a global probability distribution vector and a global matrix data object, the product vector having a size corresponding to the size of local probability distribution vectors stored in each respective computing node, receiving, via the communication network and from each computing node, a first updated probability distribution vector, wherein each first updated probability distribution vector is generated by a respective computing node by normalizing one of the local probability distribution vectors with the first product vector, generating a second global probability distribution vector by concatenating the received first updated probability distribution vectors, providing, via the communication network, each computing node with a second product vector representative of a portion of the second global probability distribution vector being multiplied with the global matrix data object, receiving, via the communication network and from each computing node, a second updated probability distribution vector, wherein each second updated probability distribution vector is generated by a respective computing node by normalizing the other one of the local probability distribution vector with the second product vector, generating a third global probability distribution vector by concatenating the received second updated probability distribution vectors, generating the optimal transportation matrix data object by scaling the global matrix data object with a first matrix data object of which the diagonal is the second global probability distribution vector and a second matrix data object of which the diagonal of the third global probability distribution vector and providing the optimal transportation matrix data object to each computing node.

The foregoing has outlined the features and technical advantages in order that the detailed description that follows may be better understood. Additional features and advantages will be described hereinafter. It should be appreciated by those skilled in the art that the conception and specific embodiment disclosed may be readily utilized as a basis for modifying or designing other structures. It should also be realized by those skilled in the art that such equivalent constructions do not depart from the spirit and scope of the embodiments described herein. The novel features which are believed to be characteristic of the invention, both as to its organization and method of operation, together with further objects and advantages will be better understood from the following description when considered in connection with the accompanying figures. It is to be expressly understood, however, that each of the figures is provided for illustration and description only and is not intended as a definition of the limits of the embodiments described herein.

BRIEF DESCRIPTION OF THE DRAWINGS

For a more complete understanding of the disclosed methods and apparatuses, reference should be made to the implementations illustrated in greater detail in the accompanying drawings, wherein.

Figure 1:
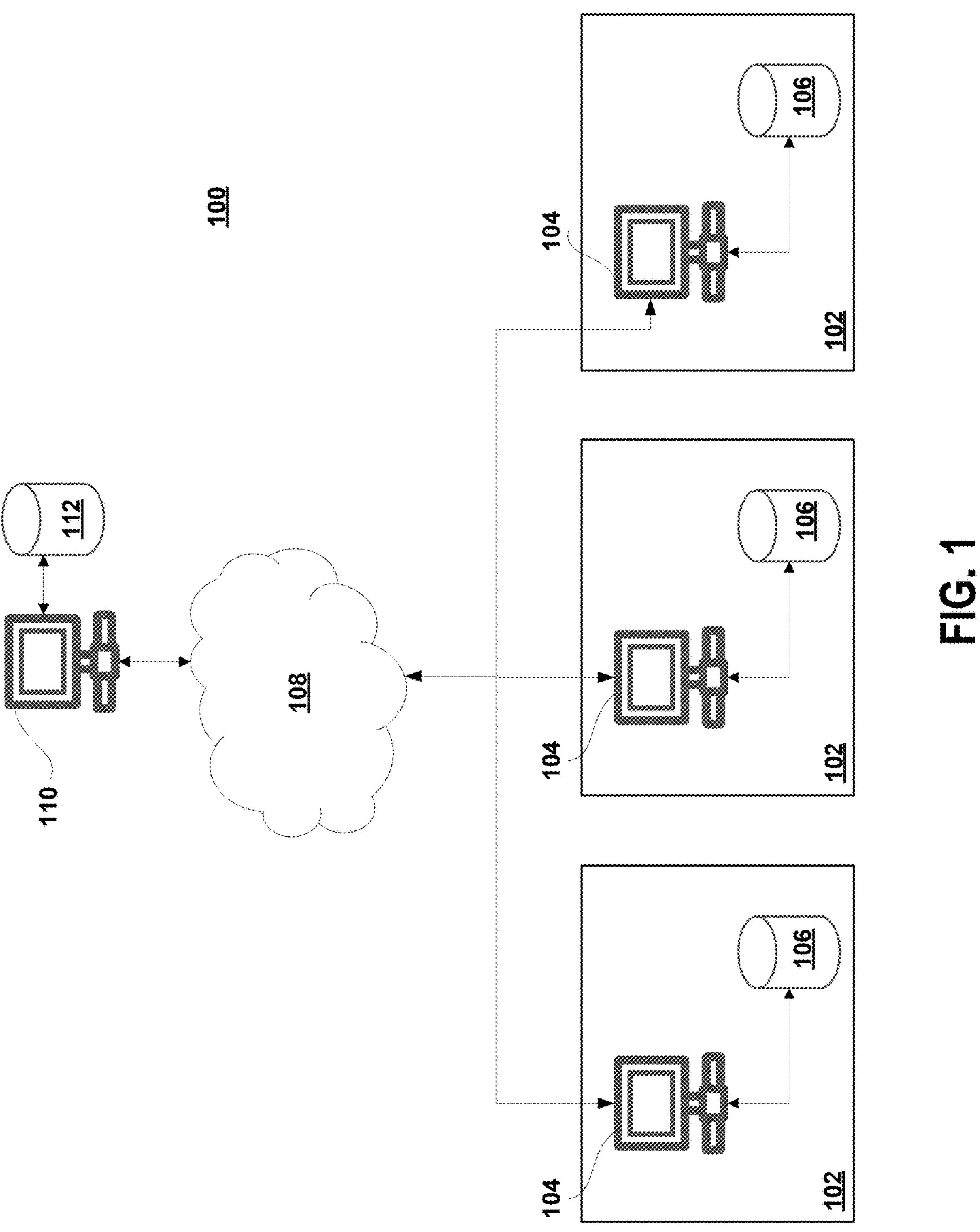
FIG. 1 is a block diagram of a federated computer processing architecture in accordance with embodiments of the present disclosure.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

The present technology relates to a computer architecture composed of a plurality of federated computing nodes that communicate with each other via a network by electronically communicating update data message objects. The principle of the federated network is that the computing nodes share the computing load across the network based on shared protocols, without having to share the initial data required to produce the results. This type of architecture is however limited, as it requires encryption of the data shared to preserve the privacy of the data of each computing node, which increases the computational work of each node. However, when the nature of the process prevents from retrieving the initial data from results shared by other nodes, which is the case for the present technology, a federated computer processing architecture offers a fast and computational powerful solution while preserving privacy.

The solution provided by the proposed technology relies on Optimal Transport (OT) approaches, which pertains to finding the most cost-efficient way to transform one probability distribution into another, given a predefined cost function. In discrete settings, the OT problem can be formulated as a linear program, but solving it directly is computationally demanding for large instances. For this reason, one may relax the OT problem using the entropy-regularization. Specifically, the problem of interest relies in addressing is the following optimization problem:

$$\underset{P\in\mathbb{R}}{\text{minimize}}\langle P, C\rangle + \epsilon\sum_{i,j=1}^{n} P_{ij}(\log P_{ij} - 1) \tag{1}$$

$$\text{subject to } \begin{array}{l} P1 = a, \\ P^{\top}1 = b, \\ P \geq 0 \end{array}$$

where P is a transportation plan matrix, with $P_{ij}$ denoting the amount of mass moved from a source point i to a target j, é$C\in\mathbb{R}^{n\times n}$ is a cost matrix, with $C_{ij}$ representing the cost of transporting unit mass from i to j, a and b are the distribution vectors and n is the dimension of the distribution vectors and the cost matrix. The term $\langle P, C\rangle=\Sigma_{i,j=1}P_{ij}C_{ij}$ computes the total transportation cost. The vectors a, $b\in\mathbb{R}^{n\times n}$ are the source and target distributions, respectively, satisfying a, b≥0 and $1^{T}a-1^{T}b$, where 1 is the vector of ones. The transportation plan matrix and the cost matrix are data object having a size of n×n, while the distribution vectors have a size of n. The terms "distribution vectors" and "probability distribution vectors" used herein refer to the same type of data object.

The entropy regularization term $$\epsilon\sum\nolimits_{i,j=1}^{n} P_{ij}(\log P_{ij} - 1)$$

accounts that the optimization problem is strictly, transforming the original linear program into a smooth problem amenable to efficient numerical methods. This regularization promotes smoother and more stable solutions, essential for iterative approaches such as the Sinkhorn approach.

The Sinkhorn approach, also known as the Sinkhorn-Knopp's fixed point iteration, is an iterative method used to solve the entropy-regularized OT problem is especially useful when accelerated by using streamlined computing architectures such as those in modern GPUs. It operates by alternately scaling the rows and columns of a kernel matrix $$K = e^{-\frac{C}{\epsilon}}$$

to enforce the marginal constraints. The optimal transportation plan is given in a diagonal scaling form:

$$P^{*} = \text{diag}(u)K\text{diag}(v) \tag{2}$$

where vectors u, v $$u, v \in \mathbb{R}_{+}^{n}$$

are updated iteratively:

$$u^{(t+1)} = \frac{a}{Kv^{(t)}},\ v^{(t+1)} = \frac{b}{K^{\top}u^{(t+1)}} \tag{3}$$

However, in many practical applications, data is distributed across multiple clients due to privacy regulations or proprietary data constraints, can occur, for example in sensitive finance applications. For instance, different banks may wish to collaborate to understand collective risk exposure without sharing sensitive customer data. In some cases, federated learning provides collaborations by enabling model training across decentralized data while preserving privacy.

The technology presented herein introduces a federated method to solve equation (1) in settings where n=cm, with c clients each holding local distributions $a^{(k)}$, $b^{(k)}\in\mathbb{R}^{m}$ for k=1, . . . c and $a=[a^{(1)}; \ldots ; a^{(c)}]$, $b=[b^{(1)}; \ldots ; b^{(c)}]$. The federated solution enables each client to compute local updates, coordinating with a server to enforce the global marginal constraints without exchanging raw data. The term "client" may refer to a computing node running the algorithm presented herein.

The convergence on an optimal transportation plan may vary, but is influenced by the value of the entropy-regularization term $\epsilon$. It has been found that the entropy-regularization term $\epsilon$ as an inverse proportionality relationship with the number of iterations required to converge on the optimal transportation plan. A small value of the entropy-regularization term $\epsilon$ thus helps reducing the number of iterations. However, reducing the value of the entropy-regularization term $\epsilon$ increases the marginal error, making difficult, even sometimes impossible, to compute the objective function. Therefore, the entropy-regularization term $\epsilon$ is selected as a tradeoff between computation time and marginal error. In some embodiments, the entropy-regularization term $\epsilon$ may be selected in a range defined between about $5\times10^{-3}$ and $10^{-6}$, depending on the implementation.

Referring to FIG. 1, block diagram illustrating aspects of a system 100 of a federated computer processing architecture in accordance with embodiments of the present disclosure is shown as a system 100. The system 100 may be configured to coordinated broadcast data messaging using the federated computer processing architecture.

As shown in FIG. 1, the system 100 includes a plurality of computing nodes 102 (three computing nodes 102 depicted), each including a computer processor 104 and a computer memory 106. The plurality of computing nodes 102 are linked together via a network 108 for wireless communication. The network 108 may be of any type of suitable network, such as a Local Area Network (LAN), a Wide Area Network (WAN), a Personal Area Network (PAN), Metropolitan Area Network (MAN) and the like. The network 108 may also be the internet. In some embodiments, the system 100 may be decentralized, i.e., in an "All-to-All" or "Peer-to-Peer" configuration, meaning that each computing node 102 shares the same computing protocols and types of data with the other computing nodes 102 across the network 108. In some other cases, the system 100 may be centralized on a server computer 110, which communicates with the plurality of computing nodes 102 via the network 108. The server computer 110 is coupled to a storage medium 112 to store data required for the computation of the Sinkhorn-Knopp approaches. In the centralized version of the system 100, node to node communication may be prevented, which lowers the risk of privacy breaches. It will also be appreciated that in the decentralized version of the system 100, the server computer 110 and the storage medium 112 coupled thereto may be omitted, which simplifies the components of the system 100.

Each computing node 102 may include a combination of GPU(s) and/or CPU(s) to process the computation. The programming of each node is not limited to a particular programming language, and can be, for instance, Python™.

At a high level, the computing nodes 102 are configured for processing a Sinkhorn-Knopp approach using locally stored data, which is private to each computing node 102, and data shared across the network 108. The processing made by the computing nodes 102 may be described as follows. Let $$K = e^{-\frac{C}{\epsilon}}$$

be an entropy-regulated kernel matrix data object associated with the cost matrix data object C. Next, recalling that n=cm, the kernel matrix data object K is block partitioned, and each client are assumed to know all of its m columns and rows, that is, K[jm:(j+1)m,:] and $K[:, jm:(j+1)m]^T$.

Locally, the kernel matrix data object K is denoted with the j'th m-block of rows in as $K_j$ and similarly $K_T$ and the probability distribution vector components $a_j$ and $b_j$, wherein $j \in [c]$. The solution is represented by the form $P=uv^T$. Each client $j \in [c]$ is considered to have a local copy $u_j$ and $v_j$, as well as intermediate probability distribution vectors $r_j$ and $q_j$, all of dimension m. Furthermore, $u_{jj}$ represents the j'th column of m components of $u_j$ and $u_{-j}$ to be the remaining matrix data object of dimension n×n−m. The probability distribution vectors $v_{jj}$, $v_{-j}$, $r_{jj}$, $r_{-j}$, $q_{jj}$, and $q_{-j}$ are defined similarly. In order to provide repeated single iterations of computation and communication, as well as local variants, the parameter $w \in N$, which aims to divide the total number of iterations by periodic communication, is introduced. That is, if w=1, then communication takes place every round, and if w=2 every other round, etc.

Figure 2A:
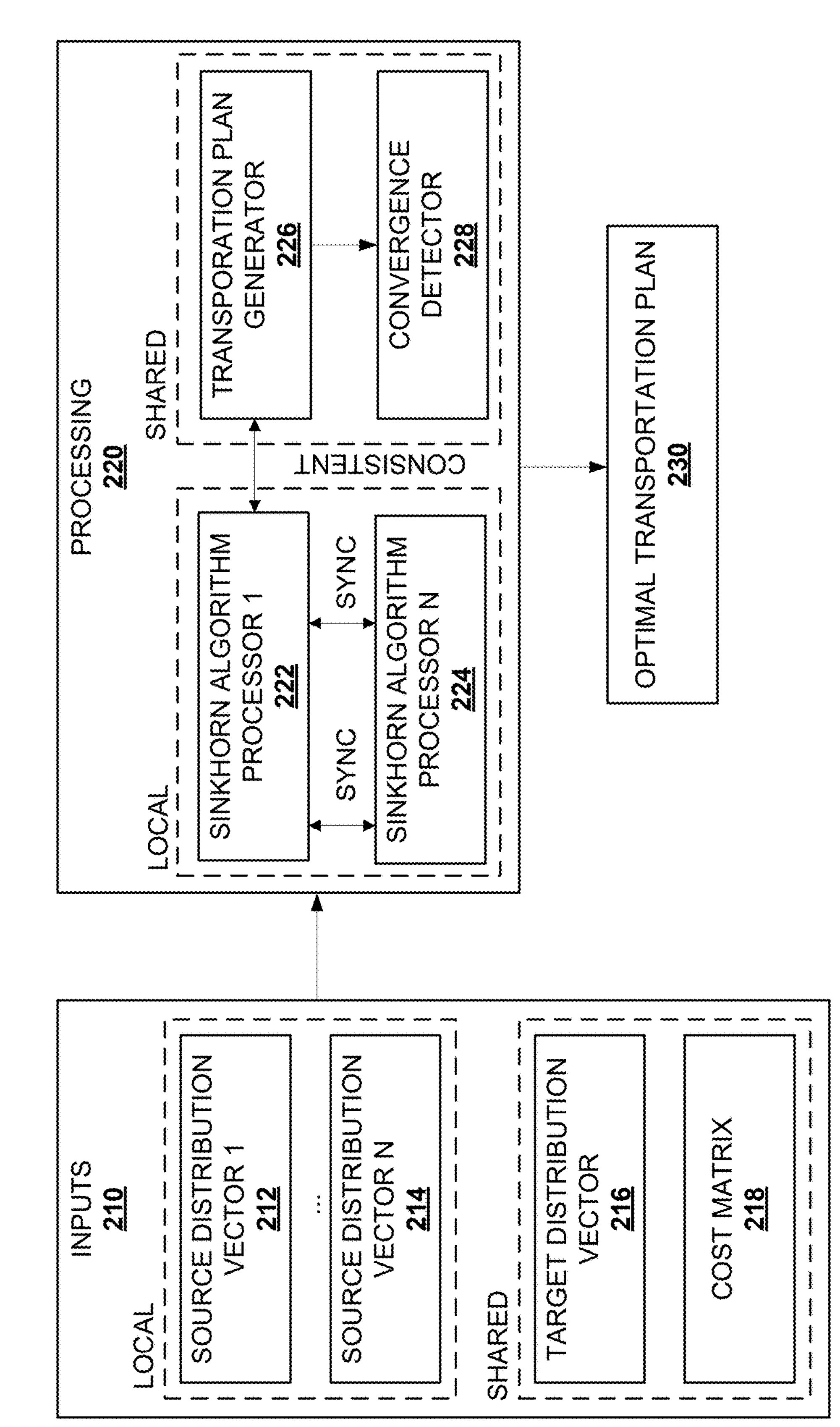
FIG. 2A is a block diagram of a method for method for synchronous coordinated broadcast data messaging in accordance with embodiments of the present disclosure.
Figure 2B:
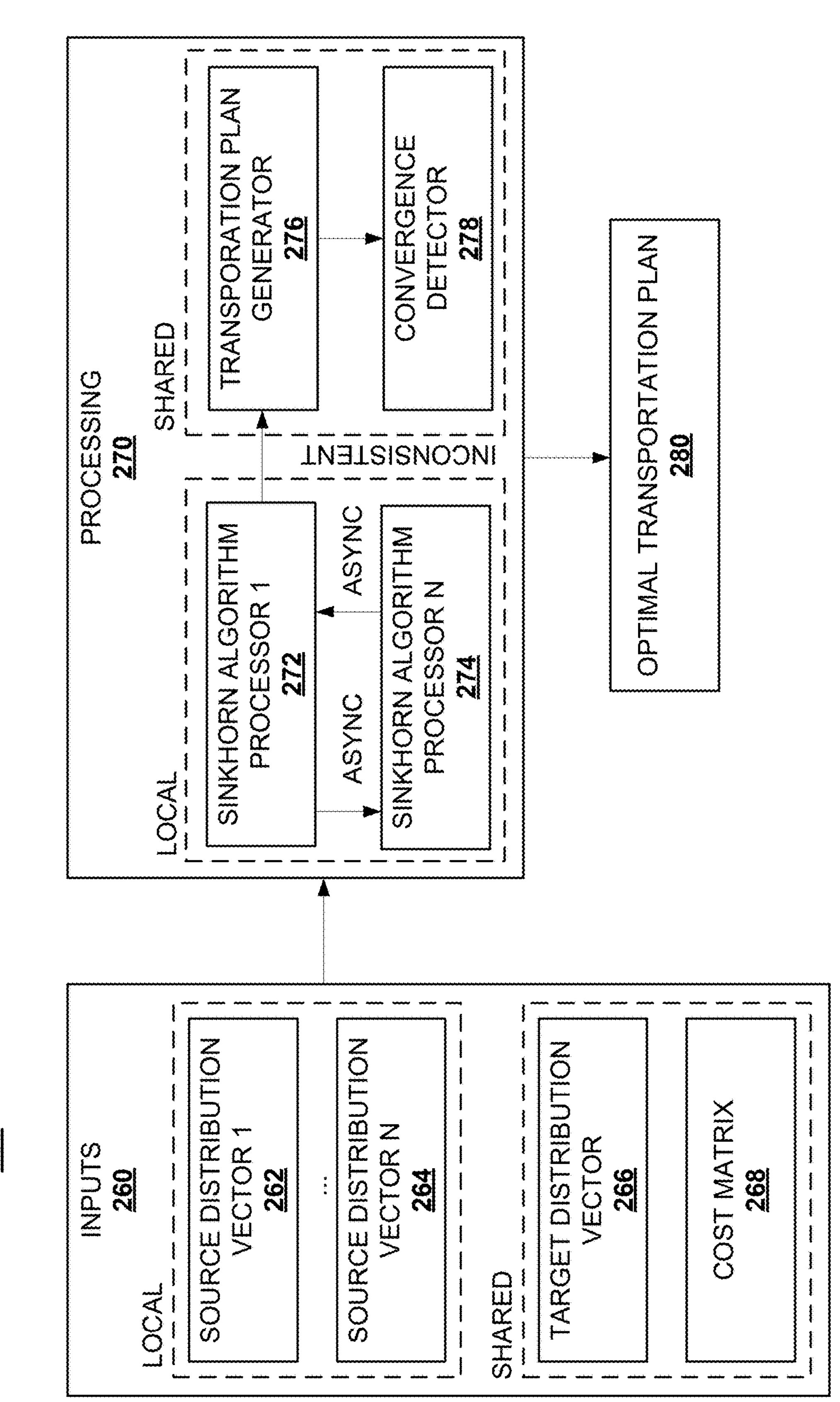
FIG. 2B is a block diagram of a method for method for asynchronous coordinated broadcast data messaging in accordance with embodiments of the present disclosure.

Now referring to FIGS. 2A-2B, there are shown block diagrams 200, 250, respectively, of a method for synchronous coordinated broadcast data messaging. Block diagrams 200, 250 include inputs 210, 260 feeding processing units 220, 270 data, which output optimal transportation plans 230, 280. The optimal transportations plans 230, 280 are functions or transfer functions that transpose a source probability distribution vector to a target probability distribution vector in an optimal manner. The terms "optimal transportation plan", "optimized transportation plan", "optimal transportation transfer function" and "optimized transportation transfer function" refer to the same feature. The term "optimal" may refer to a degree of convergence towards a local minimum or a global minimum obtain by iterating the algorithms presented herein.

The inputs 210, 260 include a plurality of source distribution vectors, including a source distribution vector 1 212, 262 up to a source distribution vector N 214, 264. The plurality of source distribution vectors include data, such as financial data, which is stored locally on each computing node 102. The inputs 210, 260 also include a target distribution vector 216, 266 and a cost matrix 218, 268, which are shared across the network 108 and are stored on the computer memory 106 of one or more computing node and/or in the storage medium 112 coupled to the server computer 110.

In some embodiments, a computing node 102 or the storage medium 112 coupled to the server computer 110 includes data objects containing a plurality of target distribution vectors 216, 266 and a plurality of cost matrixes 218, 268, and the computing node 102 or the server computer 110 is configured for providing each computing node 102 a respective distribution vector 216, 266 and cost matrix 218, 268. Alternatively, in some other embodiments, the same distribution vector 216, 266 and cost matrix 218, 268 is shared by each computing node 102 across the network 108.

The processing units 220, 270 receives the data from the inputs 210, 260 and process iteratively the source distribution vector 1 212, 262 up to the source distribution vector N 214, 264 using a Sinkhorn-Knopp approach processor 1 222, 272, up to a Sinkhorn-Knopp approach processor N 224, 274, respectively. The Sinkhorn-Knopp approach is performed by processing locally by each computing node 106 the updated probability distribution vectors using processors 1 and N 222, 224, 272, 274. Each time a source distribution vector is processed, the result is shared to a transportation plan generator 226, 276, which rescales the cost matrix data object using the updated distribution vectors shared by each computing node 106. Once the transportation plan generator generates the transportation plan, the latter is provided to a convergence detector 228, 278, which evaluates if the transportation plan is optimal by calculating, for instance the marginal error converge on a minimal value, which can vary between $10^{-17}$ to $10^{-51}$, depending on the implementation. The transportation plan generator 226, 276 and the convergence detector 228, 278 are processed by the processor 104 of one or more computing nodes 102 and/or by the server computer 110. Once the convergence detector 228, 278 establishes that the transportation plan generator 226, 228 has produced an optimal transportation plan, the latter is broadcast to the plurality of computing nodes 102 across the network 108.

In operation, and as best seen in FIG. 2A, the computing nodes 102 may be configured to wait for the other computing nodes 102 to be ready to perform the calculation on their end before processing an iteration of Sinkhorn-Knopp approach. This configuration will be referred to the "synchronous" configuration. Exemplary codes for an All-to-All system and a Star-Network system in a synchronous configuration are provided below.

Algorithm 1: Synchronous Federated Sinkhorn All to All

```
Add Input: Each client receives a set of local vectors {a_i}, {b_i} and cost
matrix {K_i}.
Communication frequency w
Output: Complete Transport Plan P
For Each Client j ∈ [c], initialize u_j, v_j
for k in 1 . . . K iterations do
  for Each Client i do
  if mod(k, w) = 0 then
    Client i does AllGather{v_-i} with [v_i]_j = v_jj for all j ∈ [c]
  end
  Multiply q_i = K_i v_i
  Compute u_ii = a_i/q_i with component-wise division
  if mod(k, w) = 0 then
    Client i does AllGather {u_-i} with [u_i]_j = u_jj for all j ∈ [c]
  end

  Multiply r_i = K_i^T u_i

  Compute v_ii = b_i/r_i with component-wise division
end
end
```

Algorithm 2: Synchronous Federated Star-Network Sinkhorn

```
Input:     Each client receives a set of local vectors
{a_i}, {b_i} and cost matrix {K_i}.
Communication frequency w
Output: Complete Transport Plan P
Server initializes u, v
for index in 1...K iterations do
      Each Client i Sends {v_ii, i} to the Server
```

-continued

Algorithm 2: Synchronous Federated Star-Network Sinkhorn

```
    for Each Client j do
        Server Receives {v_jj, j} and stores it in the j'th block of v.
    end
    Server Computes q = Kv
    Server Scatters q
    Each Client i compute u_ii = a_i/q_i with component-wise division
    for Each Client j do
        Server Receives {u_jj, j} and stores it in the j'th block of u
    end
    Server Computes r = K^T u
    Server Scatters r
    Each Client i Computes v_ii = b_i/r_i with component-wise division
end
```

In the synchronous configuration, the convergence detector 228 generates an indication to proceed to the next iteration, should the transportation plan generator 226 has produced a non-converging transportation plan. Thus, after the Sinkhorn-Knopp approach processor 1 222 has produced its results, the local processing units 220 may be put on standby before performing another iteration of Sinkhorn-Knopp approach. In other cases, in an All-to-All system, the computing nodes 102 can provide each other computing nodes 102 an indication that the processing of the iteration has been completed. In this case, the computing nodes 102 may be put on standby until they receive an indication from all the other computing nodes that the iteration has been completed. In other cases, in a Star-Network system, once each computing node 102 has completed an iteration and has provided its results to the server computer 110, the latter sends back an indication to the computing node that they can proceed in processing another iteration. Unlike the All-to-All approach, the Star-Network approach works with hierarchy between nodes. A main node, i.e., the server, has the role of gathering all the updated probability distribution vectors, concatenating them into a global probability distribution vector, and computing $$q = \frac{Kv}{r} = Ku$$

in their respective order. The server scatters the intermediate vectors q/r in the same manner as u/v are sliced across the other nodes. Meanwhile, the other computing nodes labelled "Clients" receive the intermediate vectors $q_j/r_j$ from the server, and use them along with local slices of the inputs $a_j$ and $b_j$ to compute the local iteration vectors $u_j/b_j$ before providing them to the server. The server is configured to hold until every Client node has sent its updated local slice $u_j/v_j$ to compute the full intermediate vectors q/r, and then performs a scatter function to make sure every computing node works with the same updated data. In the case of the Star-Network system, the cost matrix K is stored at the server level.

Referring now to FIG. 2B, there is shown a configuration where each computing node 102 performs iterations of processing Sinkhorn-Knopp approaches upon reception of a target distribution vector 216, notwithstanding the operations performed by other computing nodes 102. This configuration will be referred to as an "asynchronous" configuration. Exemplary codes for an All-to-All system in a synchronous configuration are provided below.

Algorithm 3: Asynchronous Federated Sinkhorn All to All

```
Input: Each client receives a set of local vectors {a_i}, {b_i} and cost
matrix {K_i}
Output: Complete Transport Plan P
For Each Client j ∈ [c], initialize u_j, v_j
for index in 1 . . . K iterations do
  for Each Client i do
    Inconsistently Broadcast {v_ii, i}
    for Each Client j do
      Check if a message from j has been sent, in which case
      Inconsistent Read {v_jj, j} and store it in the j'th block of v_-i
    end
    Multiply q_i = K_i v_i
    Compute u_ii = a_i/q_i with component-wise division
    Inconsistent Broadcast {u_ii, i}
    for Each Client j do
      Check if a message from j has been sent, in which case
      Inconsistent Read {u_jj, j} and store it in the j'th block of v_-i
    end

    Multiply r_i = K_i^T u_i

    Compute v_ii = b_i/r_i with component-wise division
  end
end
```

In the asynchronous configuration, the computing nodes 102 run their operations upon reception of a target distribution vector 216, and the results of each computing node 102 is stored on the computer memory 106 of one or more computing node 102 or in the storage medium 112 coupled to the server computer 110. Once the results of each computing node 102 for a given iteration are received by the transportation plan generator 276, the latter generates a transportation plan for this iteration and provide the transportation plan to the convergence detector 278. In some embodiments, once convergence is detected by the convergence detector 278, an indication to stop operations is provided to all the computing nodes 102.

In the synchronous approach, the computing nodes are on standby after completing an iteration of distribution vector updating. Once all the nodes have processed their local calculation, a signal is sent across the network to all nodes to proceed with the next iteration. This approach limits the computation speed of the overall system to the computing capacities of the weakest link. However, by rescaling the global cost matrix using the updated distribution vectors of each node at each iteration, it prevents nodes from diverging from the optimal solution. In the asynchronous approach, each node performs iterations of updating distribution vectors once they receive a target distribution vector. This approach maximizes the computational speed of the system by enabling nodes with strong computational power to perform more iterations than weaker nodes. However, in this approach, it is possible for nodes to diverge from the optimal solution, in which case the target distribution vector sent to a diverging node would need to be reinitialized before performing further iterations. A combination of both approaches can be contemplated, such as alternating between a synchronous and an asynchronous approach over a predetermined amount of iterations and/or time. Also, nodes can be grouped into subgroups, e.g., in function of their computational power, and each subgroup can operate in a synchronous or asynchronous configuration, depending on the implementation.

Figure 3:
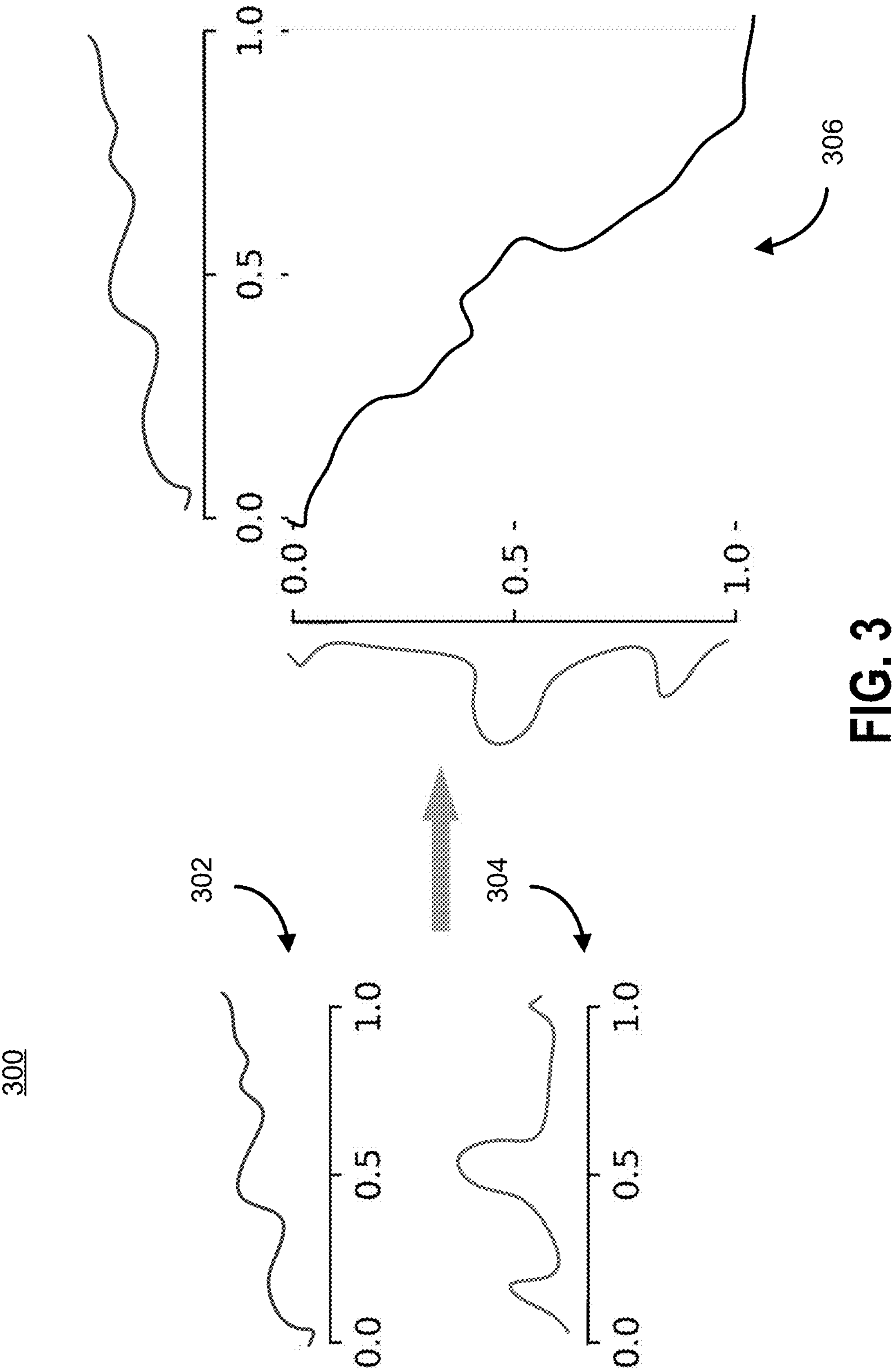
FIG. 3 is a process for generating a graph of an optimal transportation plan in accordance with embodiments of the present disclosure.

Now referring to FIG. 3, there is shown a process 300 for generating a graph 302 of an optimized transportation plan. Graphs 304, 306 show a source distribution vector and a target distribution vector, respectively. Using the Sinkhorn- Knopp approaches described herein, the graph 302 is generated. The graph 302 is an optimal transportation transfer function representative of the optimal transportation plan.

Figure 4A:
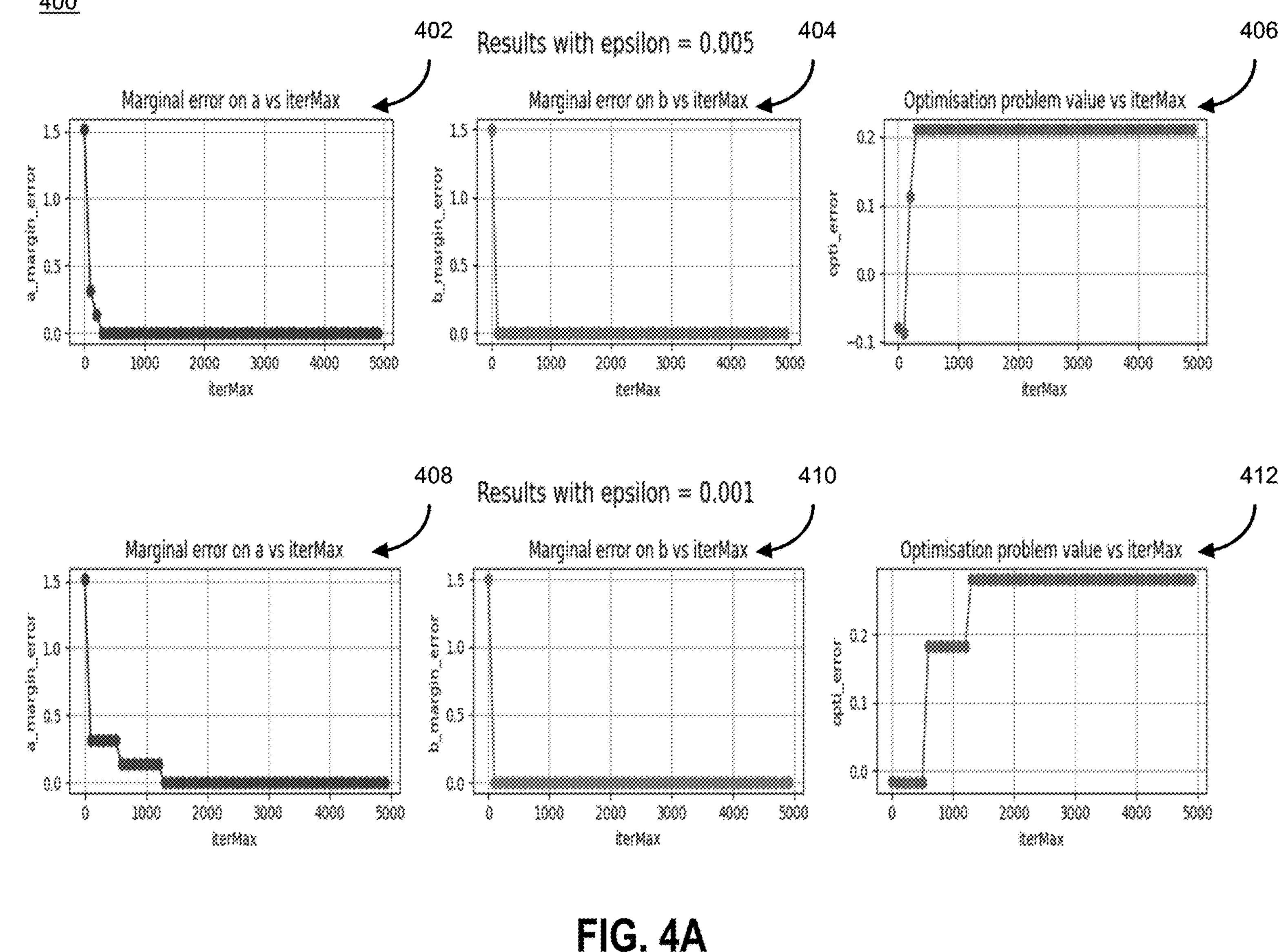
FIG. 4A shows graphs of various parameters varying as a function of iterations in accordance with embodiments of the present disclosure.
Figure 4B:
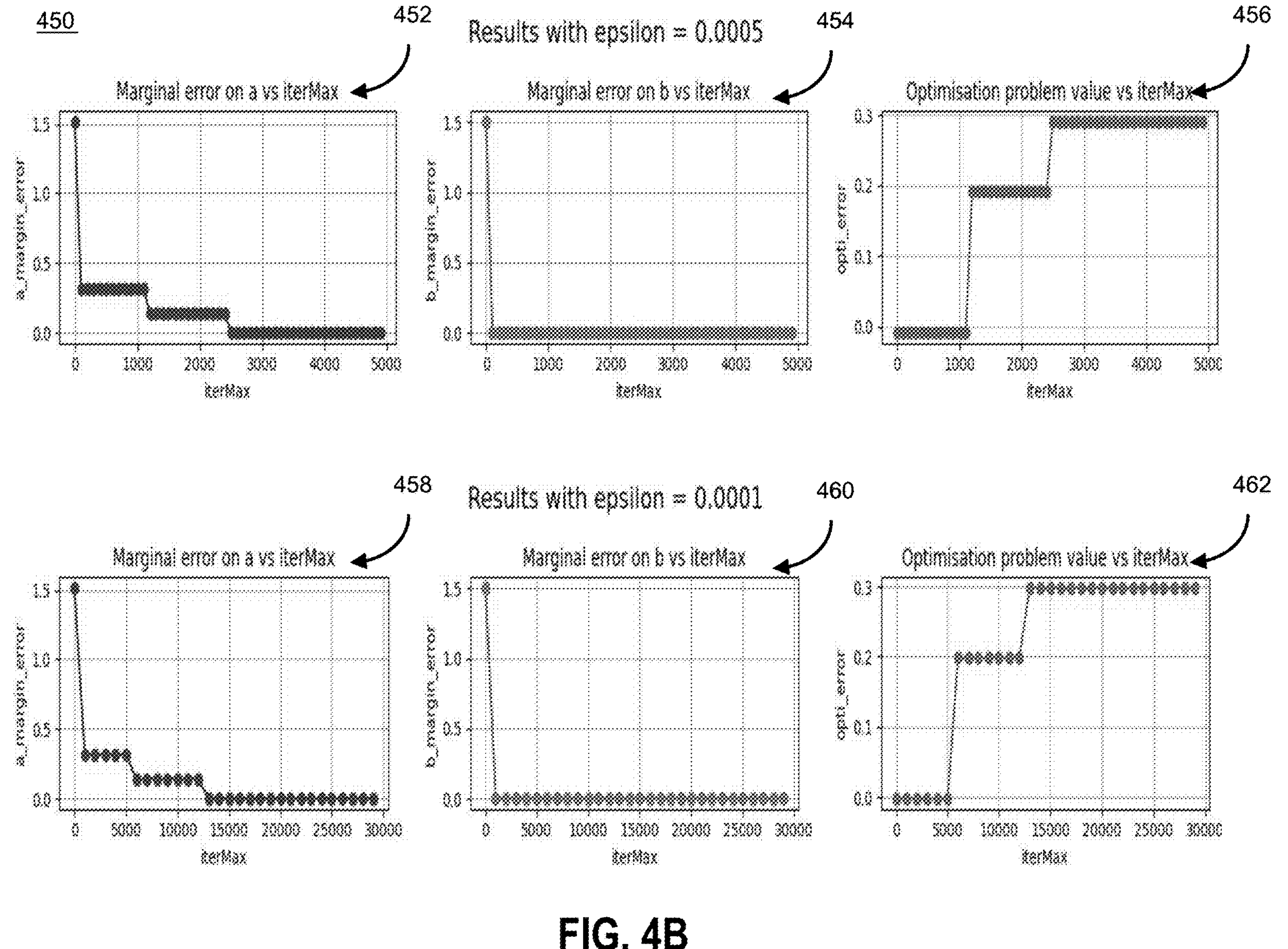
FIG. 4B shows other graphs of various parameters varying as a function of iterations in accordance with embodiments of the present disclosure.

Now referring to FIGS. 4A and 4B, there is shown graphs 400, 402, 404, 406, 408, 410, 450, 452, 454, 456, 458, 460 of various parameters varying as a function of iterations. Graphs 400, 402, 404 are representative of the marginal error on parameter "a," the marginal error on parameter "b" and the optimization problem value as a function of the number of iteration for an epsilon value of 0.005. Graphs 406, 408, 410 are representative of the marginal error on parameter "a," the marginal error on parameter "b" and the optimization problem value as a function of the number of iteration for an epsilon value of 0.001. Graphs 450, 452, 454 are representative of the marginal error on parameter "a," the marginal error on parameter "b" and the optimization problem value as a function of the number of iteration for an epsilon value of 0.0005. Graphs 456, 458, 460 are representative of the marginal error on parameter "a," the marginal error on parameter "b" and the optimization problem value as a function of the number of iteration for an epsilon value of 0.0001.

FIGS. 4A and 4B show that the objective function's value's evolution is inversely proportional to that of the marginal errors. Indeed, enforcing constraints over the marginals has an impact on the minimal value the objective function can reach. As $\epsilon$ gets smaller, a higher number of iterations is necessary to make both marginal errors converge to a minimal value, which can be in the order of $10^{-17}$ for one and $10^{-51}$ for the other. The approximate minimal number of iterations, which is referred to as $N_{min}$ for the objective function to converge for each value of $\epsilon$: $\epsilon=5\cdot10^{-3}$, $N_{min}=300$; $\epsilon=10^{-3}$, $N_{min}=1300$; $\epsilon=10^{-4}$, $N_{min}=13{,}000$; and $\epsilon=10^{-5}$, $N_{min}=130{,}000$. At least at this scale, the number of iterations is inversely proportional to $\epsilon$. Using 1,300,000 iterations with $\epsilon=10^{-6}$ makes the two marginal constraints converge, but some elements in the resulting matrix P are rounded down to 0 even with the decimal precision, making it hard to compute the objective function.

Figure 5:
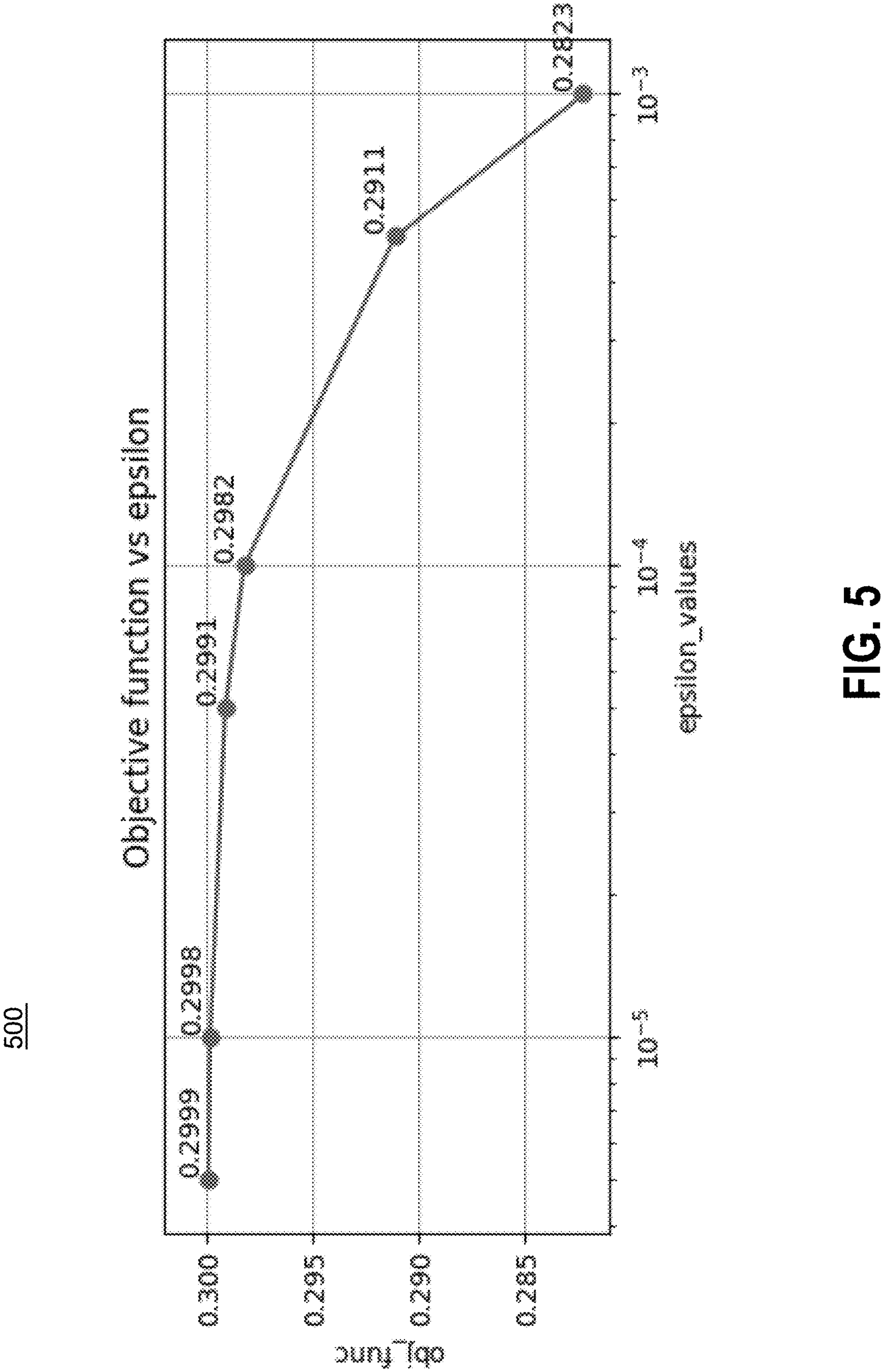
FIG. 5 is a graph of an objective function in accordance with embodiments of the present disclosure.

Referring now to FIG. 5, there is shown a graph 500 of an objective function for multiple values of $\epsilon$. Graph 500 shows that the minimal value is converging towards 0.3 as $\epsilon$ gets smaller. This effect may be caused by the objective function getting closer to the value of $\langle P,C \rangle$ without the regularization term.

Figure 6A:
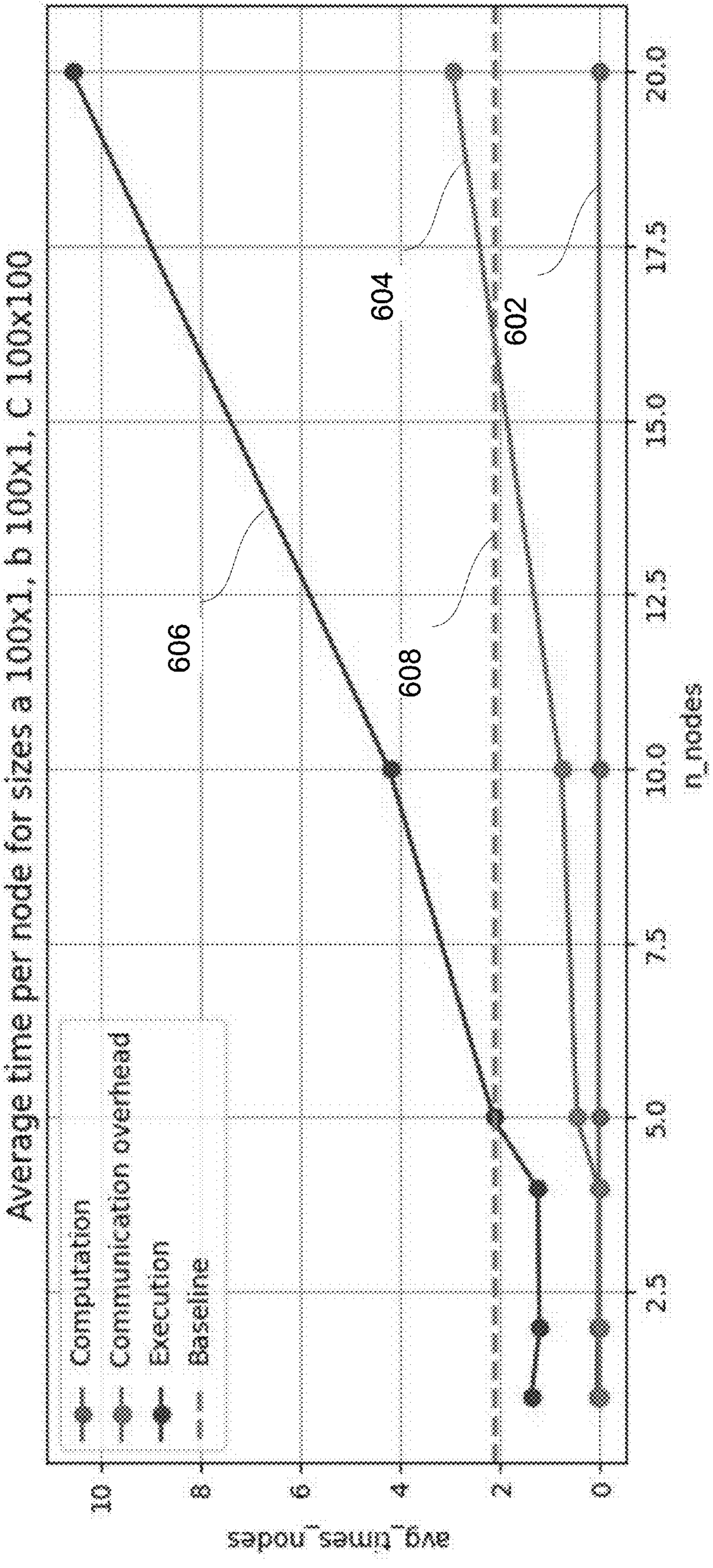
FIG. 6A is a graph of performance metrics of a federated computer processing architecture in accordance with embodiments of the present disclosure.
Figure 6B:
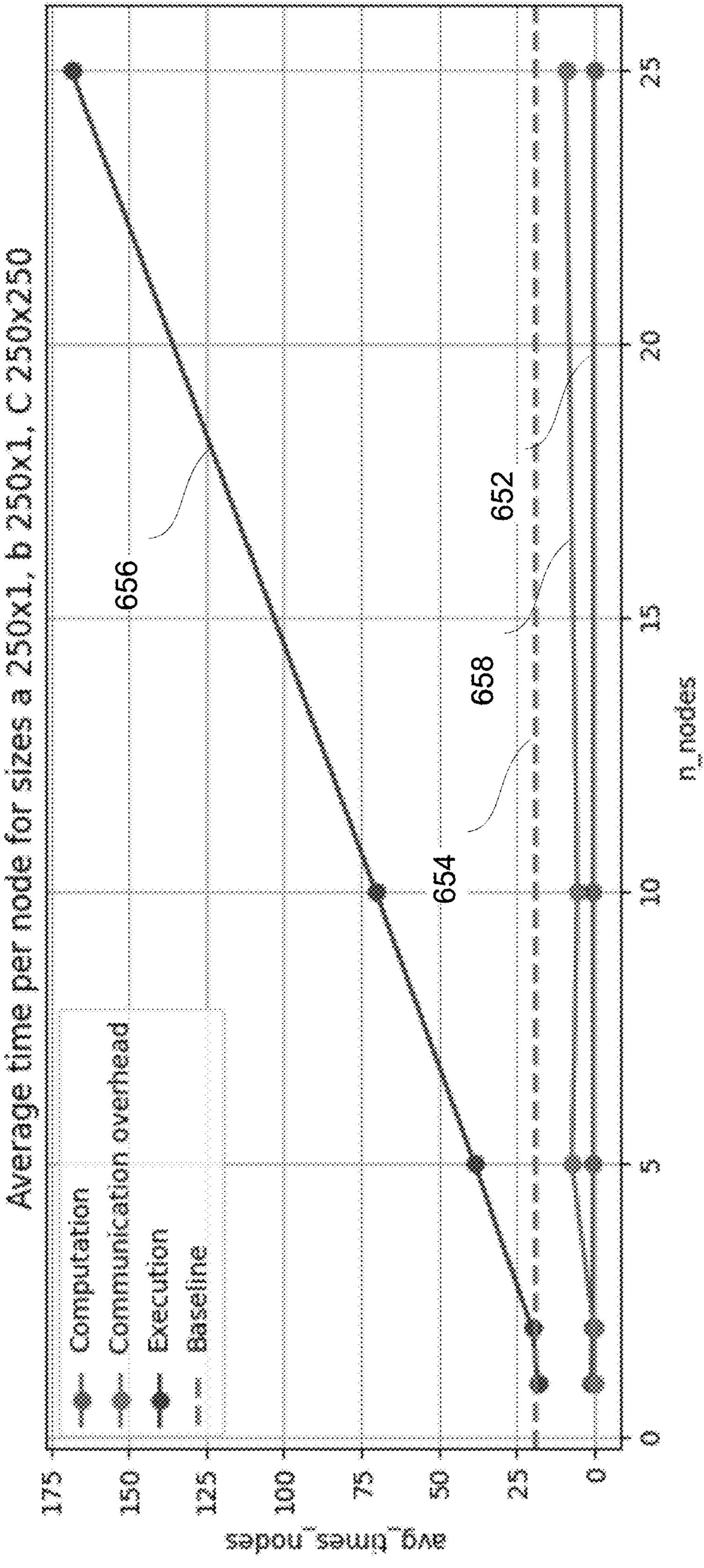
FIG. 6B is another graph of performance metrics of a federated computer processing architecture in accordance with embodiments of the present disclosure.
Figure 7A:
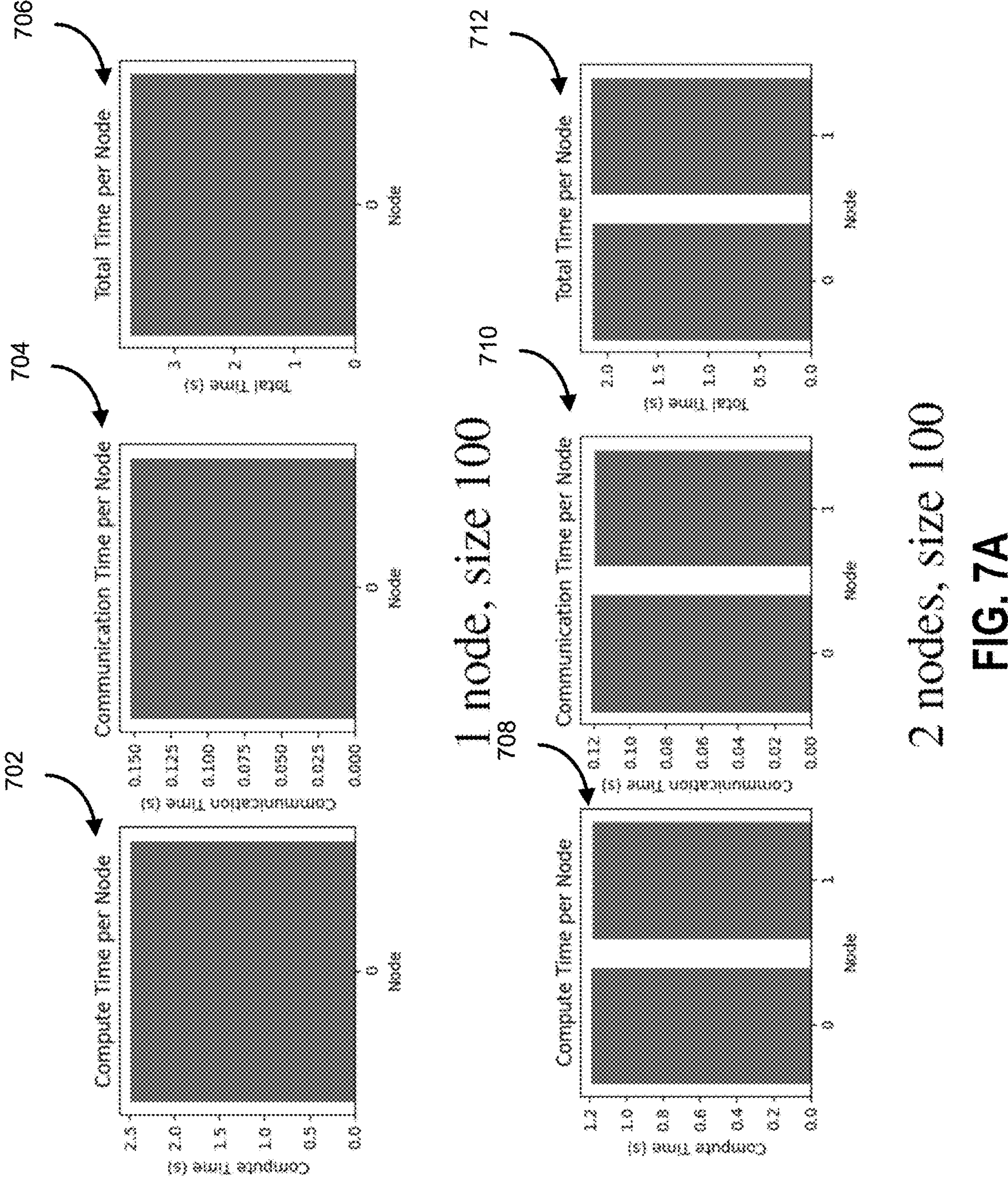
FIG. 7A shows other graphs of performance metrics of a federated computer processing architecture in accordance with embodiments of the present disclosure.
Figure 7B:
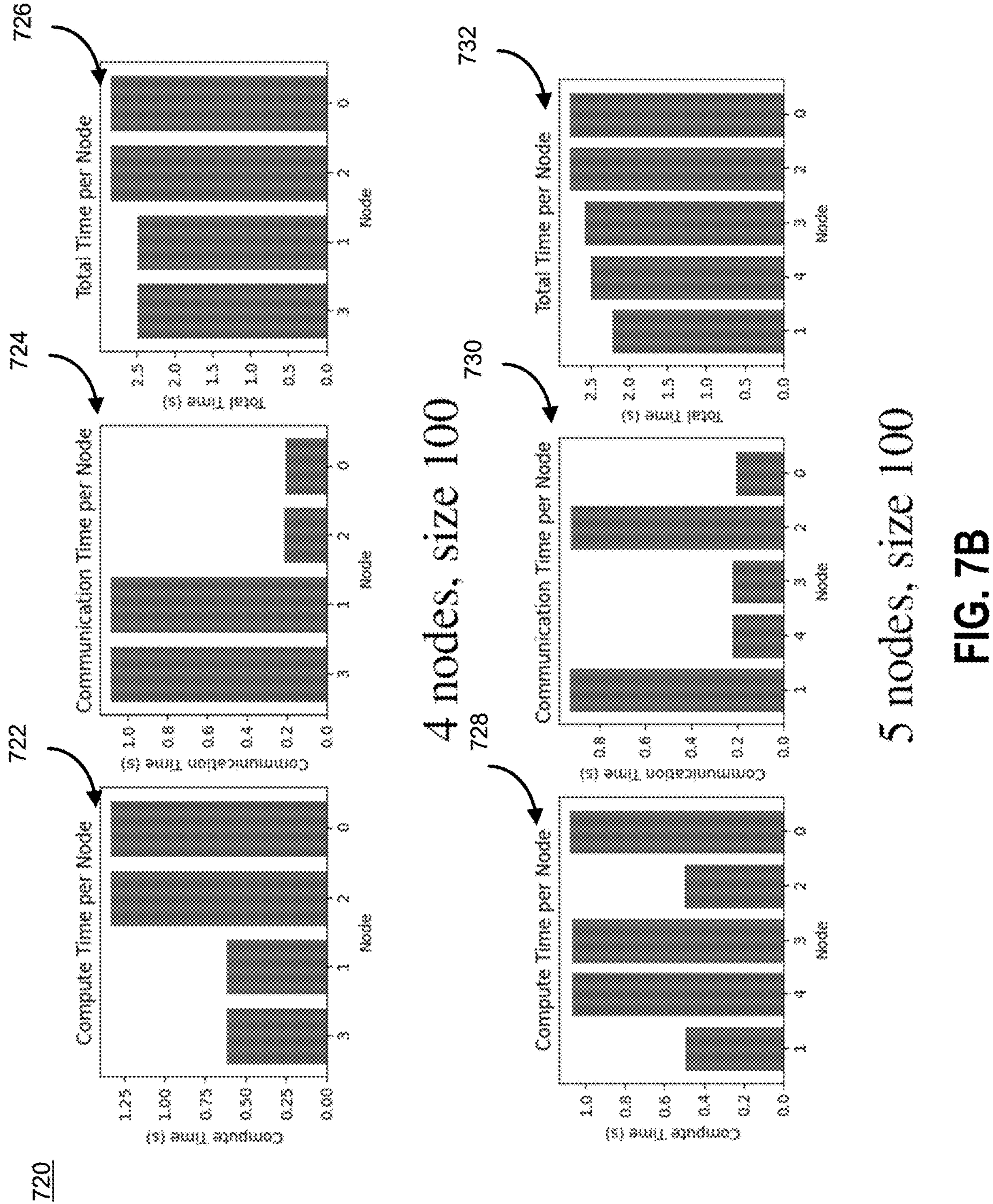
FIG. 7B shows other graphs of performance metrics of a federated computer processing architecture in accordance with embodiments of the present disclosure.
Figure 7C:
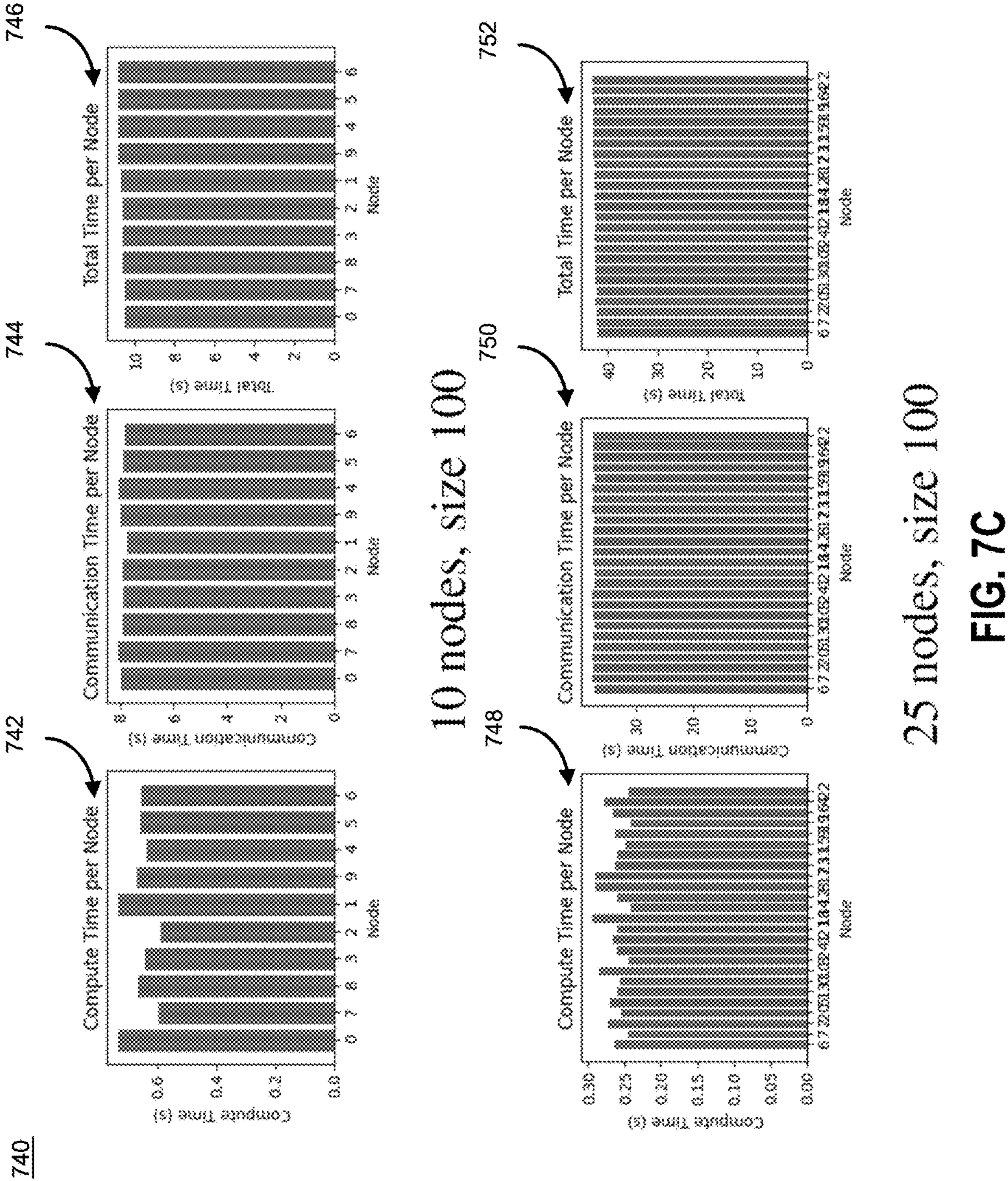
FIG. 7C shows other graphs of performance metrics of a federated computer processing architecture in accordance with embodiments of the present disclosure.
Figure 7D:
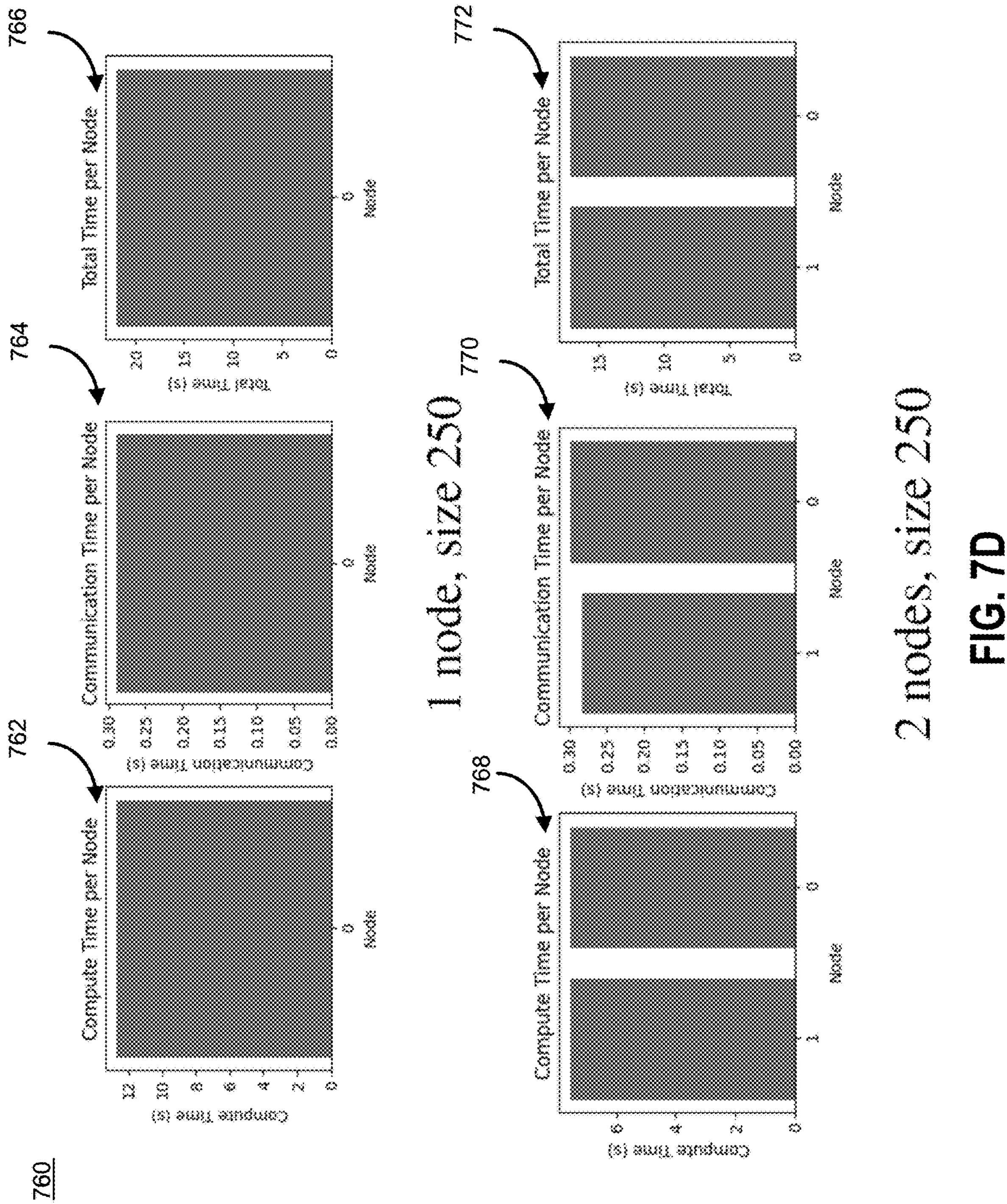
FIG. 7D shows other graphs of performance metrics of a federated computer processing architecture in accordance with embodiments of the present disclosure.
Figure 7E:
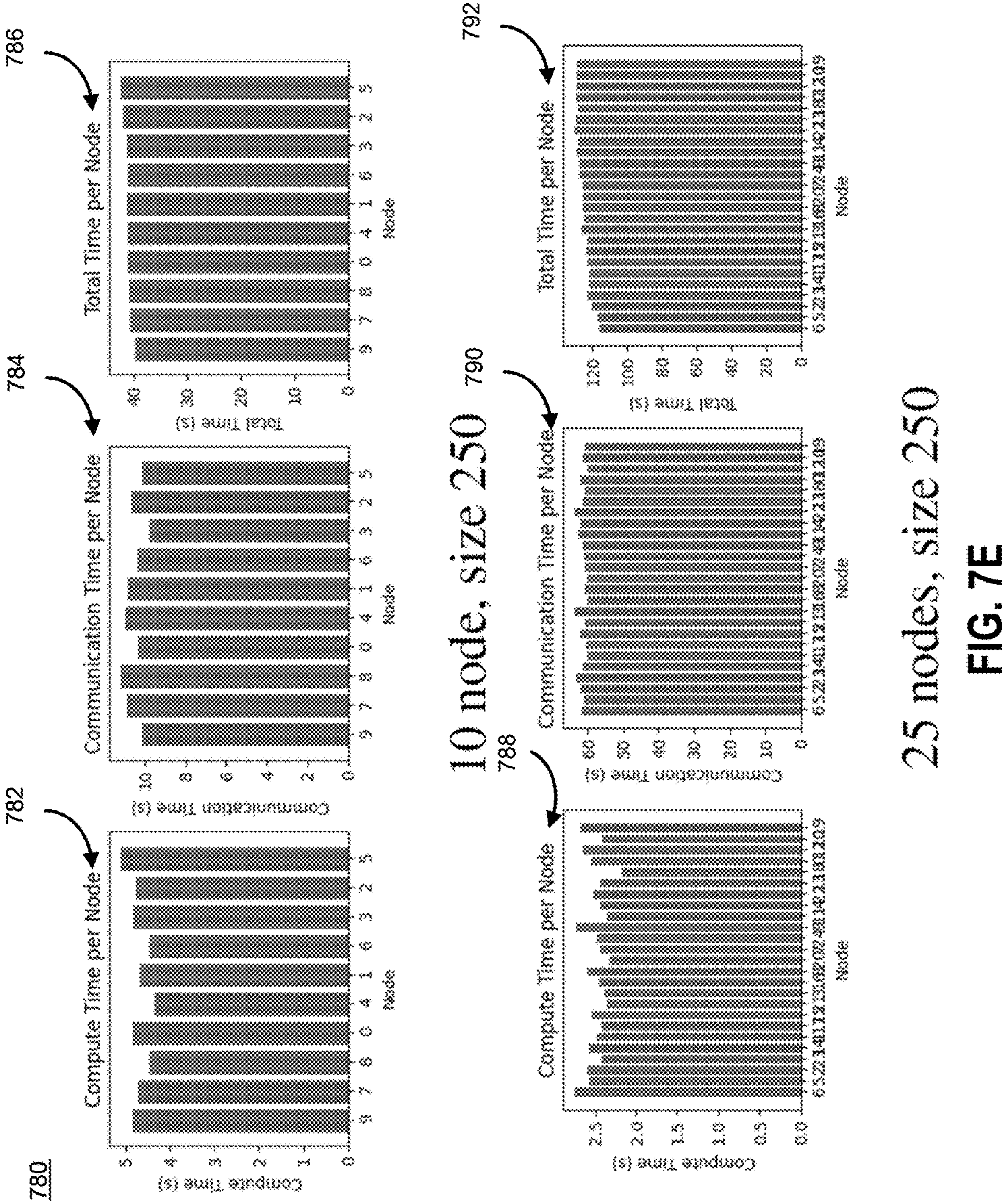
FIG. 7E shows other graphs of performance metrics of a federated computer processing architecture in accordance with embodiments of the present disclosure.

FIGS. 6A and 6B are a graphs 600, 650 of performance metrics of a federated computer processing architecture. Graph 600 includes a computation regression 602, a communication overhead regression 604, an execution regression 606 and a baseline 608, and graph 650 includes a computation regression 652, a communication overhead regression 654, an execution regression 656 and a baseline 658. As seen in graphs 600, 650, even though the computation time is decreasing with the number of nodes, the communication overhead is increasing. However, the computation time is increasing for operations unrelated to the iterations. The performance metrics are dependent on the resources of the used processing devices.

Referring now to FIGS. 7A, 7B, 7C, 7D and 7E, there are shown graphs 700, 710, 720, 730, 740, 750, 760, 770, 780, 790 of performance metrics of a federated computer processing architecture. Graphs 700 include a computation time per node graph 702, and communication time per node graph 704 and a total time per node graph 706 for a system having one node and distribution vectors of size 100. Graphs 710 include a computation time per node graph 712, and communication time per node graph 714 and a total time per node graph 716 for a system having two nodes and distribution vectors of size 100. Graphs 720 include a computation time per node graph 722, and communication time per node graph 724 and a total time per node graph 726 for a system having four nodes and distribution vectors of size 100. Graphs 730 include a computation time per node graph 732, and communication time per node graph 734 and a total time per node graph 736 for a system having five nodes and distribution vectors of size 100. Graphs 740 include a computation time per node graph 742, and communication time per node graph 744 and a total time per node graph 746 for a system having ten nodes and distribution vectors of size 100. Graphs 750 include a computation time per node graph 752, and communication time per node graph 754 and a total time per node graph 756 for a system having 25 nodes and distribution vectors of size 100. Graphs 760 include a computation time per node graph 762, and communication time per node graph 764 and a total time per node graph 766 for a system having one node and distribution vectors of size 250. Graphs 770 include a computation time per node graph 772, and communication time per node graph 774 and a total time per node graph 776 for a system having two nodes and distribution vectors of size 250. Graphs 780 include a computation time per node graph 782, and communication time per node graph 784 and a total time per node graph 786 for a system having ten nodes and distribution vectors of size 250. Graphs 790 include a computation time per node graph 792, and communication time per node graph 794 and a total time per node graph 796 for a system having 25 nodes and distribution vectors of size 250.

FIGS. 7A, 7B, 7C, 7D and 7E show that on the number of nodes where the execution time is below the local execution, the computation and communication times are evenly distributed between the nodes. This phenomenon is observable for graphs 720 and 730. With a greater number of nodes and larger distribution vectors, the device's resources becomes the limitation and observed results differ with the RCI cluster. Indeed, graphs 720 and 730 show what is expected to happen with proper resources for the OT problem. Some node is dominant for computation, while others will distribute the information. This is expected to happen in a normal network of nodes. However, the current observation is expected due to the device's limited resources, which causes differences in amount of memory available to each process, or simply is nature to variability in the system. Another observable behavior is the spread between faster node and slower node increases with the number of nodes, even though there is no consistency with which one is the fastest.

Figure 8:
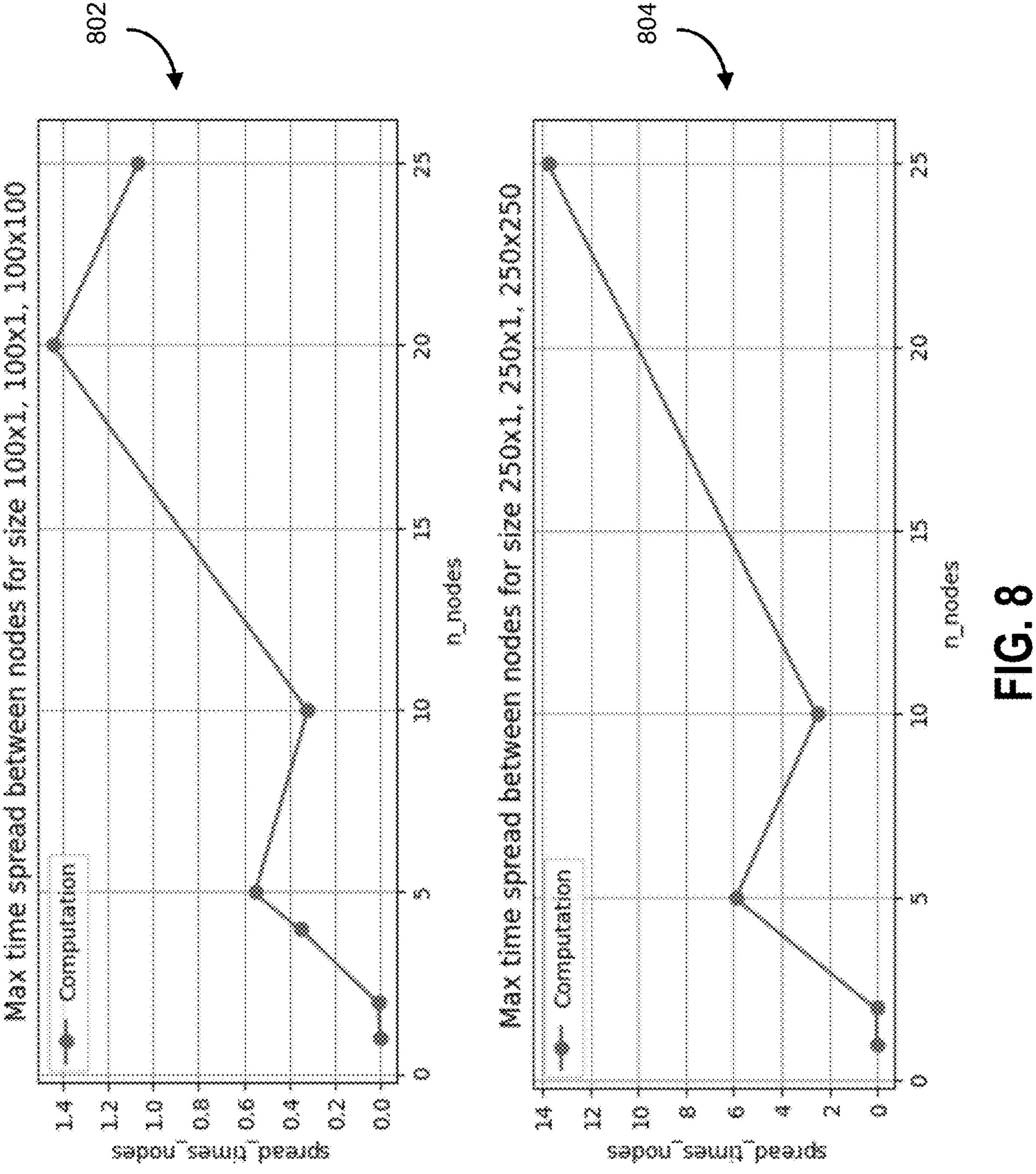
FIG. 8 shows other graphs of performance metrics of a federated computer processing architecture in accordance with embodiments of the present disclosure.

FIG. 8 shows other graphs 800, 802 of performance metrics of a federated computer processing architecture. Graph 800 shows the maximum time spread between nodes for distribution vectors of size 100. Graph 802 shows the maximum time spread between nodes for distribution vectors of size 250.

A use case using the systems and methods presented herein will now be described. First, the concept of Ambiguity Set is introduced, which can be written as follows:

$$\mathcal{P}_\delta = \{P \in \mathcal{P}(\mathbb{R}^d) \mid W_c(P, \hat{P}) \leq \delta\} \tag{4}$$

Where $\hat{P}$ is the empirical distribution obtained from historical financial data, $\cdot\,\mathcal{P}(\mathbb{R}^d)$ is the set of all probability distributions on $\mathbb{R}^d$, $W_c(P, \hat{P})$ is the Wasserstein distance between P and $\hat{P}$ with cost function c(x,y) and $\delta \geq 0$ specifies the maximum allowable deviation from the empirical distribution $\hat{P}$. In other words, the ambiguity set is defined as the Wasserstein Ball, centered around the empirical distribution $\hat{P}$ and of radius δ.

The worst-case expected loss may be defined as:

$$\rho_{worst} = \sup_{P \in \mathcal{P}_\delta} \mathbb{E}_P[l(X)] \quad (5)$$

Where l: $\mathbb{R}^d \to \mathbb{R}$ is a loss function (in our case, a negative portfolio return). The worst-case expected loss $\rho_{worst}$ is the maximum expected loss over all distributions P within the Wasserstein ball of radius δaround $\hat{P}$.

Using duality principles from optimal transport theory, the worst-case expected loss can be expressed as:

$$\rho_{worst} = \inf_{\lambda \geq 0} \{\lambda\delta + \mathbb{E}_{\hat{P}}[h_\lambda(X)]\} \quad (6)$$

Where λ≥0 is a dual variable associated with the Wasserstein constraint, $h_\lambda(x) = \sup_{x' \in \mathbb{R}^d} \{l(x') - \lambda c(x, x')\}$ and c(x, x') is the cost function used in the Wasserstein distance. The dual formulation shifts the problem from maximizing over distributions P to minimizing over the scalar variable λ, thus transforming the problem into a more tractable optimization.

The term $\mathbb{E}_{\hat{P}}[h_\lambda(X)]$ involves a supremum over x', which can be interpreted within the optimal transport framework when discretized. Considering n data points $$\{x_i\}_{i=1}^n$$

from $\hat{P}$, each with equal probability $$\hat{p}_i = \frac{1}{n},$$

and m potential outcomes $$\{x'_j\}_{j=1}^m,$$

which could be the same as $\{x_i\}$). For each $x_i$, the following equation applies:

$$h_\lambda(x_i) = \max_{x'_j} \{l(x'_j) - \lambda c(x_i, x'_j)\} \quad (7)$$

A joint probability distribution $P_{ij}$ representing the transport plan can be introduced, that is the amount of probability mass transported from $x_j$ to $x'_j$. The following limitation should be considered in the calculation of the optimal transportation plan: Positivity: $P_{ij} \geq 0$, source marginal constraint:

$$\sum_{j=1}^m P_{ij} = a_i = \hat{p}_i = \frac{1}{n},$$

∀i, target marginal constraint:

$$\sum_{i=1}^n P_{ij} = b_j, \forall j$$

and Wasserstein cost constraint:

$$\sum_{i=1}^n \sum_{j=1}^m P_{ij} c(x_i, x'_j) \leq \delta.$$

$h_\lambda(x_i)$ can be reinterpreted as the optimal value of an optimization problem over $P_{ij}$, as follows:

$$h_\lambda^{OT}(x_i) = \max_{P_{ij} \geq 0, \sum_j P_{ij} = \hat{p}_i} \left\{\sum_{j=1}^m P_{ij}(l(x'_j) - \lambda c(x_i, x'_j))\right\} \quad (8)$$

For a fixed $x_i$, $P_{ij}$ is maximized, which is subject to the constraint that the total mass leaving $x_i$ is $\hat{p}_i$. The objective function $$\sum_{j=1}^m P_{ij}(l(x'_j) - \lambda c(x_i, x'_j))$$

represents the total adjusted loss for $x_i$ when distributing its mass to $$x'_j$$

with consideration of the cost. Since $\hat{p}_i$ is fixed and a linear function is maximized over $P_{ij}$ with a constraint $\Sigma_j P_{ij} = \hat{p}_i$, the optimal solution will allocate all mass to the $$x'_j$$

that maximizes $l(x'_j) - \lambda c(x_i, x'_j)$. Therefore, for this specific case:

$$h_\lambda^{OT}(x_i) = \hat{p}_i \max_{x'_j} \{l(x'_j) - \lambda c(x_i, x'_j)\} \quad (9)$$

However, $$\hat{p}_i = \frac{1}{n},$$

so:

$$h_\lambda^{OT}(x_i) = \frac{1}{n} \max_{x'_j} \{l(x'_j) - \lambda c(x_i, x'_j)\} = \frac{1}{n} h_\lambda(x_i) \quad (10)$$

Which shows that the transport plan $P_{ij}$ directly relates to the original problem $h_\lambda(x_i)$.

Considering now the combined objective over all $x_i$:

$$\sum_j \hat{p}_i h_\lambda(x_i) = \sum_j \hat{p}_i \max_{x'_j}\{l(x'_j) - \lambda c(x_i, x'_j)\} \quad (11)$$

Instead of treating the elements of the summation as separate optimization problems, the elements can be combined into one unique optimization problem over $P_{ij}$ for all i and j. The objective function can be rewritten:

$$\sum_{i=1}^{n}\sum_{j=1}^{m} P_{ij}\left(l(x'_j) - \lambda c(x_i, x'_j)\right) \quad (12)$$

The optimal transport problem is a minimization problem. To solve this, the negative of the objective function can be considered, which gives an equivalent minimization problem. Thus, the optimal transport problem can be written:

$$\min_{P_{ij}}\left\{\sum_{i=1}^{n}\sum_{j=1}^{m} P_{ij}\left(\lambda c(x_i, x'_j) - l(x'_j)\right)\right\} \quad (13)$$

Subject to the limitation in the calculation of the optimal transportation plan detailed above. In this context, the loss function $l(x'_j)$ introduces an additional term in the objective. One can think of $-l(x'_j)$ as a cost associated with transporting mass to $x'_j$. The higher the loss at $x'_j$, the more favorable it is to transport mass there, since the goal is to compute the worst-case expected loss. Thus, a new combined cost matrix can be defined by:

$$C_{ij} = \lambda c(x_i, x'_j) - l(x'_j) \quad (14)$$

The problem becomes a conventional optimal transport problem:

$$\min_{P_{ij}}\left\{\sum_{i=1}^{n}\sum_{j=1}^{m} P_{ij} C_{ij}\right\} \quad (15)$$

Subject to the limitation in the calculation of the optimal transportation plan detailed above. To solve this problem using the Sinkhorn-Knopp algorithm, an entropic regularisation term can be added, which is represented by the following equation:

$$\min_{P_{ij}}\left\{\sum_{i=1}^{n}\sum_{j=1}^{m} P_{ij} C_{ij} + \epsilon \sum_{i=1}^{n}\sum_{j=1}^{m} P_{ij}(\log P_{ij} - 1)\right\} \quad (16)$$

Subject to the limitation in the calculation of the optimal transportation plan detailed above, where $\epsilon>0$ is the regularisation parameter. Assuming n=m and name $P_\delta$ the ambiguity set on $\mathcal{P}(\mathbb{R}^{n\times n})$, then it can be rewritten as the following:

$$\underset{P\in\mathcal{P}_\delta}{\text{minimize}}\langle P, C\rangle + \epsilon \sum_{i,j=1}^{n} P_{ij}(\log P_{ij} - 1) \quad (17)$$

-continued $$\text{subject to} \quad (P1)_i = a_i = \frac{1}{n}, \quad P^\top 1 = b, \quad P \geq 0$$

The Wasserstein constraint at optimality enforces the following:

$$\langle P^*, c\rangle = \sum_{i=1}^{n}\sum_{j=1}^{m} P^*_{ij} c(x_i, x'_j) = \delta \quad (18)$$

The goal is to find $\lambda^*$ such that the total cost under P* is equal to $\delta$. Since C is a function of $\lambda$, then P* needs to be recomputed after each update of $\lambda$. Here are iterative steps that can be processed to solve equation 18:

1. Use the Sinkhorn-Knopp algorithm to find P*
2. Compute the total cost $\langle P^*, c\rangle$
3. Adjust $\lambda$ accordingly:
   - If totalcost>$\delta$, increase $\lambda$ to penalize transport cost more
   - If totalcost<$\delta$, decrease $\lambda$
   - If totalcost=$\delta$, stop the loop
4. Repeat steps 1-3 until step 3 breaks the loop The process presented above returns a set containing $\lambda^*$ and P*, providing the transport plan complying to both the optimal transportation and the Wasserstein constraints.

Considering a portfolio of assets (e.g. stocks) with historical return data. In a multi-node environment (e.g. computers from different geographies), each node holds a subset of the data. Considering the portfolio loss as the loss function:

$$l(x) = -w^T x \quad (19)$$

Where w is the portfolio weight vector and x is the asset return vector. For the cost function, the squared Euclidean distance can be set:

$$c(x_i, x'_j) = (x_i - x'_j)^2 \quad (20)$$

Thus, the consolidated cost matrix becomes:

$$C_{ij} = \lambda(x_i - x'_j)^2 + w^T x \quad (21)$$

Assuming a vector of empirical data points x with a uniform probability distribution a (i.e. $\forall i$, $$\left.a_i = \frac{1}{n}\right),$$

distributed across nodes and assuming a target outcome x' with a target distribution b, values for $\lambda$, $\delta$, $\epsilon$ and weight values for w, either distributed across nodes or shared can be set. The above can thus be used to compute each node's local slice of C. Then the problem can be solved with the Federated Sinkhorn-Knopp algorithm to find the optimal transportation plan P* which solves the problem.

Figure 9:
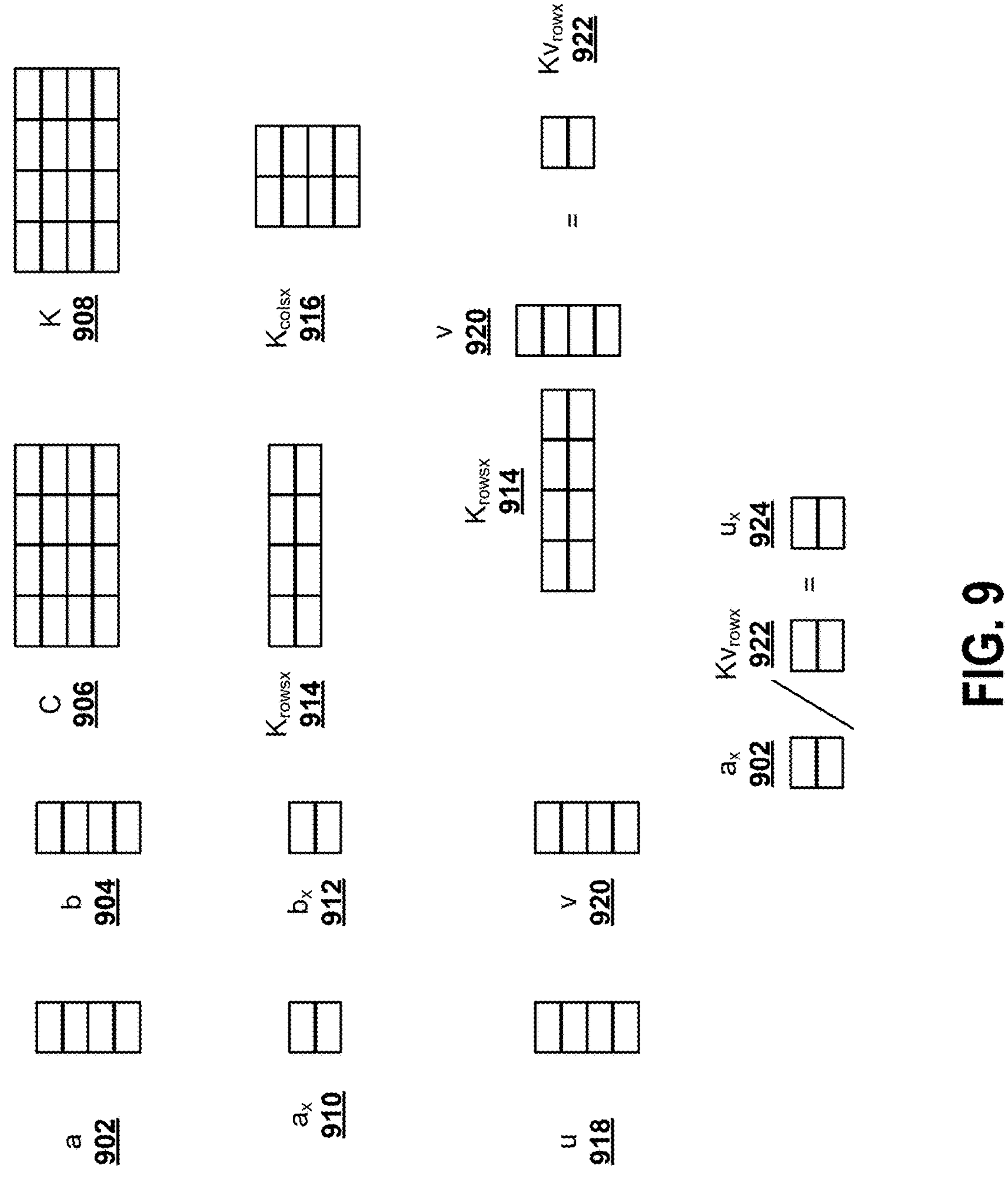
FIG. 9 shows data objects used for generating an optimal transportation function in accordance with embodiments of the present disclosure.

Referring to FIG. 9, there are shown data objects 900 used for generating an optimal transportation transfer function. The data objects 900 include a source distribution vector a 902, a source distribution vector b, a cost matrix data object 906 and a kernel matrix data object 908. The relationship between the cost matrix data object 906 and the kernel matrix data object 908 can be established by $$K = e^{-\frac{C}{\epsilon}}.$$

At the computing node level, each computing node has stored thereon a local source distribution vector $a_x$ 910 and local source distribution vector $b_x$ 912, which are subsets of the source distribution vector a 902 and the source distribution vector b 904, respectively. Each computing node has also stored thereon a horizontally sliced portion 914 of the kernel matrix data object 908 and a vertically sliced portion 916 of the kernel matrix data object 908. The computing node receives a global distribution vector u 918 and a global distribution vector v 920. The term "global" used herein refers to a data object of the size of the whole network, while the term "local" used herein refers to a data object processed at the node level, e.g., the local probability distribution vectors. In operation, and using, for instance, the objects labelled with "x," the computing node calculates a product between the horizontally sliced portion 914 and the global distribution vector v, thereby obtaining the product vector $Kv_{rowx}$ 922. The computing node generates an updated distribution vector $u_x$ 924 by dividing the local source distribution vector $a_x$ 910 with the product vector $Kv_{rowx}$ 922. This updated distribution vector $u_x$ 924 is thereafter sent to another computing node for processing another updated distribution vector. Once the subsets of the global distribution vector v 920 have been updated by the system, the global distribution vector u 918 is replaced by a new global distribution vector u resulting from the concatenation of the distribution vectors updated by the computing nodes.

Similarly as to the process with respect to the global vector u 918, for replacing the global distribution vector v 920, the computing node calculates a product between the a transpose of the vertically sliced portion 916 and the global distribution vector u, thereby obtaining the product vector $Ku_{colx}$. The computing node then generates an updated distribution vector $v_x$ by dividing the local source distribution vector $b_x$ 904 with the product vector $Ku_{colx}$. This updated distribution vector $v_x$ is thereafter sent to another computing node for processing another updated distribution vector. Once the subsets of the global distribution vector u 918 have been updated by the system, the global distribution vector v 920 is replaced by a new global distribution vector v resulting from the concatenation of the distribution vectors updated by the computing nodes. With the new distribution vectors u and v, the kernel matrix data object 908 with the diagonal of the new distribution vectors u and v to obtain the optimal transportation transfer function. While the size of the distribution vectors and matrix data object of the data object 900 are defined in FIG. 9, the size thereof may vary depending on the implementation.

Figure 10:
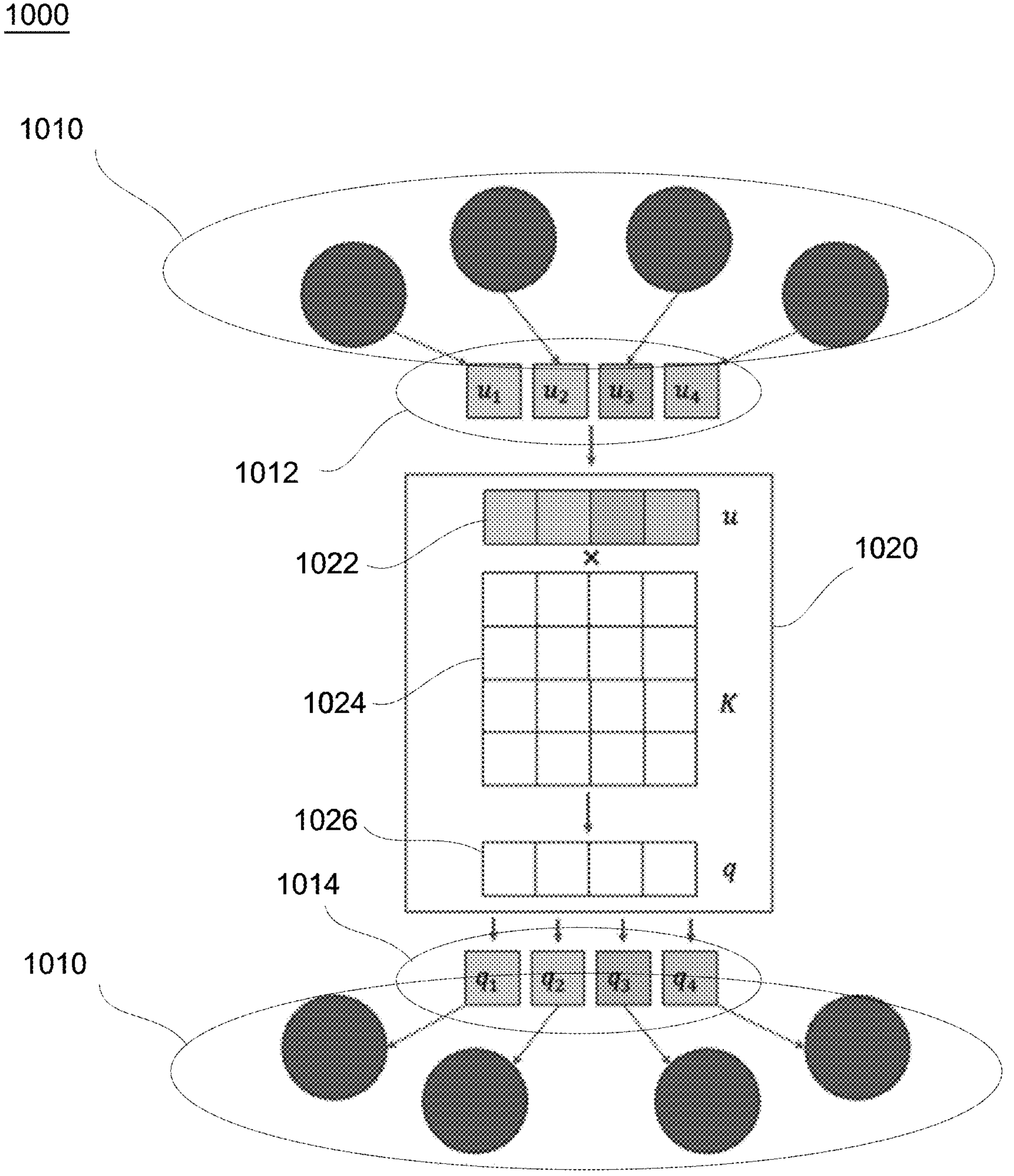
FIG. 10 is a block diagram of a star-network system in accordance with embodiments of the present disclosure.

Now referring to FIG. 10, there is shown a block diagram 1000 of a process in a Star-Network system, which includes a plurality of computing nodes 1010 in communication with a server. At a high level, in the process presented in the block diagram 1000, the computing nodes provide the server 1020 with a set of updated probability distribution vectors 1012, and receive to the server 1020 respective product vectors 1014. Each computing nodes of the plurality of computing nodes 1010 computes its respective updated probability distribution vector using a local probability distribution vector and a previously received product vector. Upon reception of the updated probability distribution vectors 1012 from each computing node 1010, the server concatenates the updated probability distribution vectors 1012 into a global distribution vector 1022. Thereafter, the server 1020 multiplies the global distribution vector 1022 with a cost matrix 1024, thereby obtaining an intermediate global vector 1026. Once having obtained the intermediate global vector 1026, the server 1020 scatters the intermediate global vector 1026 amongst the computing nodes 1010.

Figure 11:
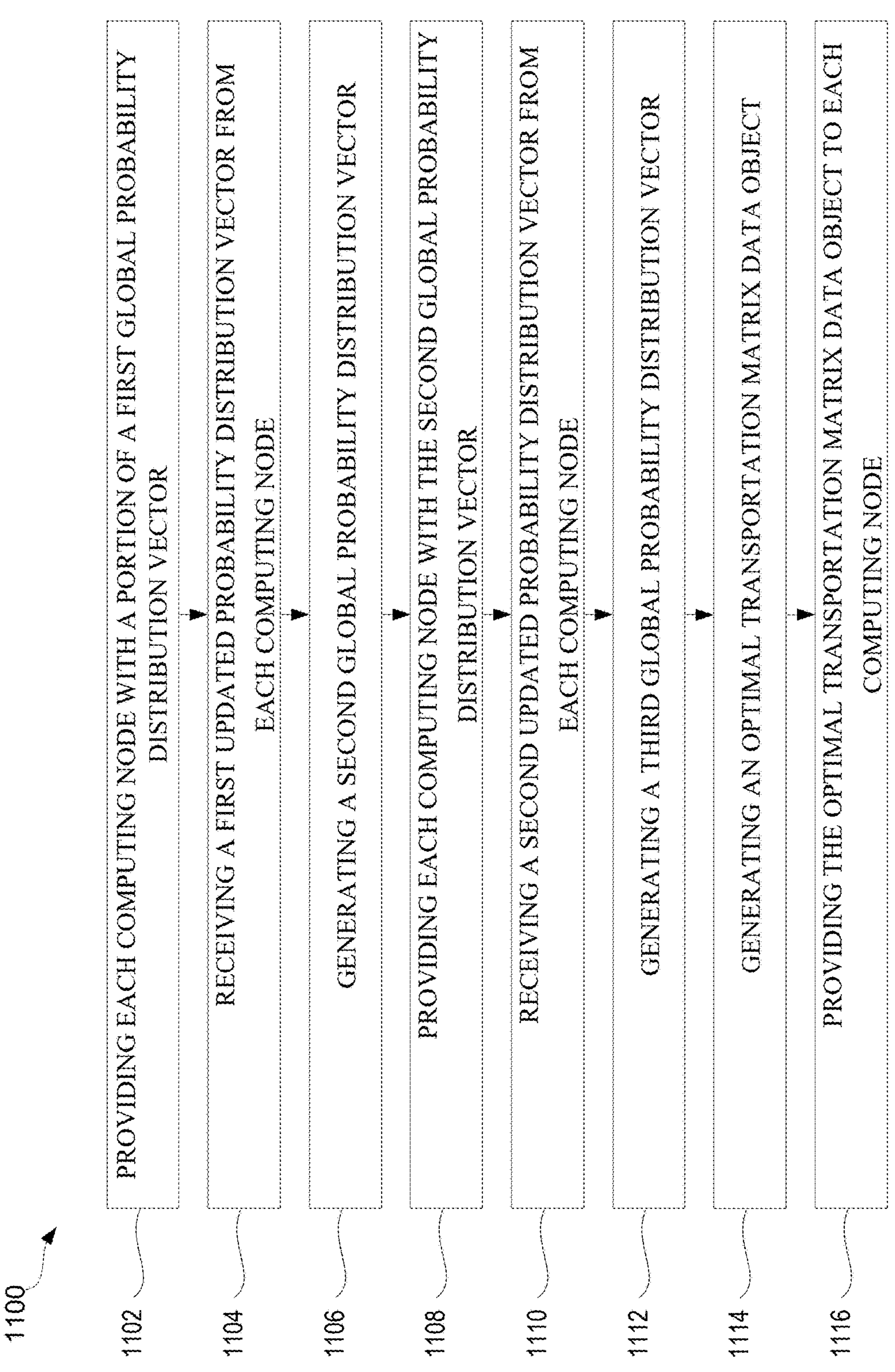
FIG. 11 is a flow diagram of a method for coordinated broadcast data messaging in accordance with embodiments of the present disclosure.

Referring to FIG. 11, there is shown a flow diagram of a method 1000 for coordinated broadcast data messaging. The method 1100 can be performed by a computing node 102 or the server 110 of the system 100. At a high level, the method 1100 describes the process of a computing node 102 or the server 110 performing an iteration of Sinkhorn-Knopp approach processing. The method 1100 described below may be implemented in a centralized (all-to-all) system in both the asynchronous and the synchronous configurations.

At step 1102, the computing node 102 provides, via a communication network, each computing node or other computing node of a plurality of computing nodes with a portion of a first global probability distribution vector. Each computing node has stored thereon a pair of local probability distribution vectors representative of local data and a shared matrix data object representative of an assigned portion of a global matrix data object. The portion of the first global probability distribution vector has a size corresponding to the size of the local probability distribution vectors.

At step 1104, the computing node 102 receives, via the communication network and from each computing node or other computing node, a first updated probability distribution vector. Each first updated probability distribution vector is generated by a respective computing node by normalizing one of the local probability distribution vectors stored in the respective node with a product of the shared matrix data object and the portion of the first global probability distribution vector.

At step 1106, the computing node 102 generates a second global probability distribution vector by concatenating the received first updated probability distribution vectors.

At step 1108, the computing node 102 provides, via the communication network, each other computing node with the second global probability distribution vector.

At step 1110, the computing node 102 receives, via the communication network and from each computing node or other computing node, a second updated probability distribution vector. Each second updated probability distribution vector is generated by a respective computing node by normalizing the other one of the local probability distribution vector of the respective computing node with a product of a transpose of the shared matrix data object and the portion of the second global probability distribution vector.

At step 1112, the computing node 102 generates a third global probability distribution vector by concatenating the received second updated probability distribution vectors.

At step 1114, the computing node 102 generates an optimal transportation matrix data object by scaling the global matrix data object with a first matrix data object of which the diagonal is the second global probability distribution vector and a second matrix data object of which the diagonal of the third global probability distribution vector.

At step 1116, the computing node 102 provides the optimal transportation matrix data object to each computing node or other computing node. In operation, the computing node 102 is configured to generate the optimal transportation plan by concatenating the matrix data object with the pair of updated distribution vectors obtained from each computing node 102. In the All-to-All configuration, the given computing node 102, which has stored thereon all the pairs of distribution vectors obtained from each other computing node 102, is generating the transportation plan.

Figure 12:
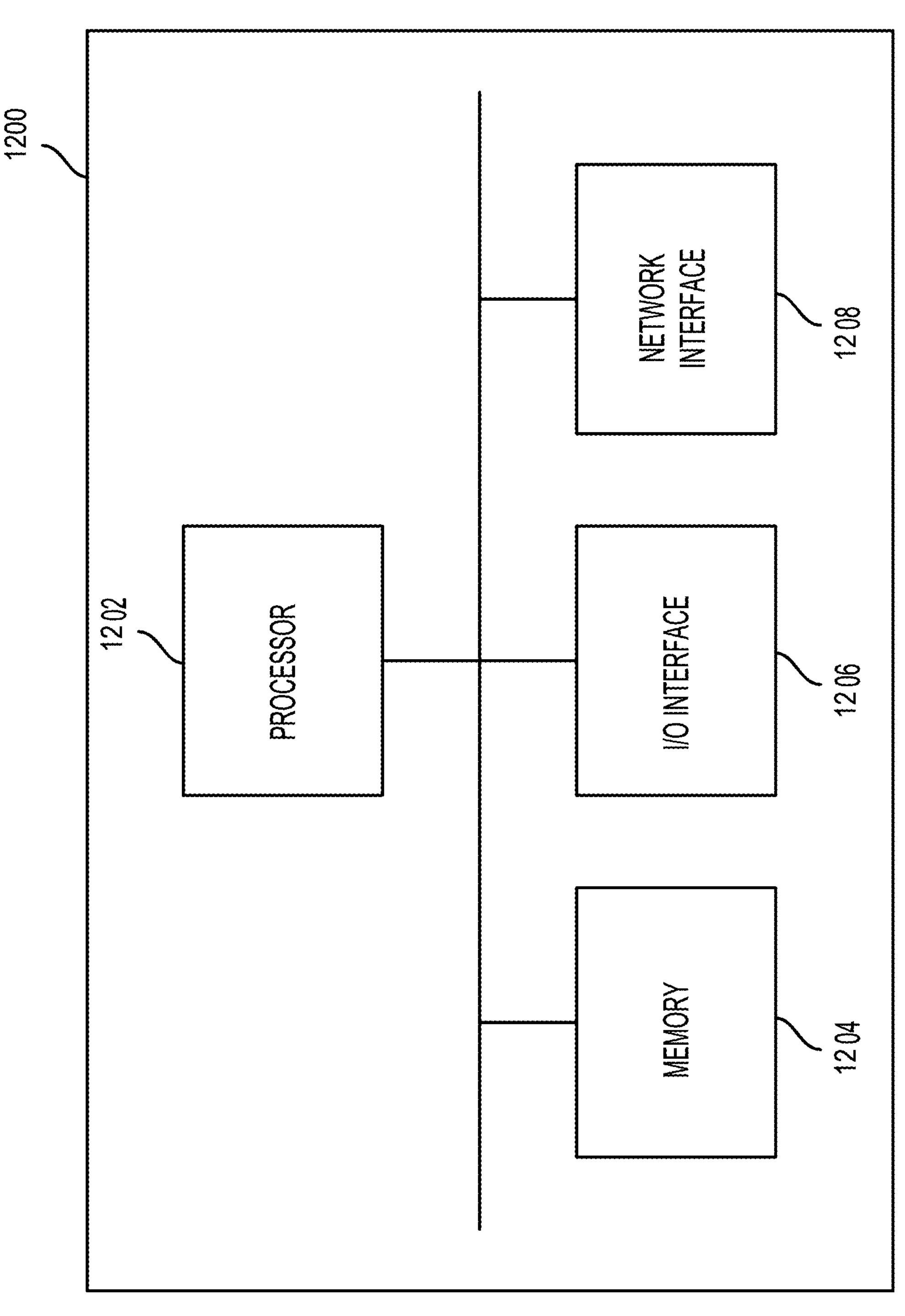
FIG. 12 is a schematic diagram of an electronic device in accordance with embodiments of the present disclosure.

FIG. 12 is a schematic diagram of an electronic device 1200 for coordinated broadcast data messaging. As depicted, electronic device 1200 includes at least one processor 1202, memory 1204, at least one I/O interface 1206, and at least one network interface 1208.

Each processor 1202 may be, for example, a microprocessor or microcontroller, a digital signal processing (DSP) processor, an integrated circuit, a field programmable gate array (FPGA), a reconfigurable processor, a programmable read-only memory (PROM), or a combination thereof.

Memory 1204 may include a suitable combination of a type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like.

Each I/O interface 1206 enables electronic device 1200 to interconnect with one or more input devices, such as a keyboard, mouse, camera, touch screen and a microphone, or with one or more output devices such as a display screen and a speaker.

Each network interface 1208 enables electronic device 1200 to communicate with other components, to exchange data with other components, to access and connect to network resources, to serve applications, and perform other computing applications by connecting to a network (or multiple networks) capable of carrying data.

In some embodiments, there may be provided a computing device for coordinated broadcast data messaging. The computing device may be a rack-mounted computer device that provides generating updated distribution vectors. To do so, the computing device has an inlet for receiving signal data including a matrix data object, a source distribution vector and a target distribution vector. The computing device includes a processor for updating the distribution vectors. The computing device has an outlet for outputting a signal including the updated distribution vectors.

In some embodiments, there may be provided a system for coordinated processing across a federated computer processing architecture using coordinated broadcast data messages between a plurality of computing nodes. The system allows each node to receive the benefits from shared computation, which increases the speed at which the optimal transportation matrix data object is provided to the computing node. The process of generating the optimal transportation matrix data object utilizes in part local data of the computing nodes at the local computational level, but, due to the federated aspect of the system, privacy of this local data is preserved throughout the process.

In some embodiments, there may be provided systems having both centralized aspects and decentralized aspects. For instance, a centralized system may include clusters of computing nodes that operate between themselves in a decentralized configuration, and vice-versa. Similarly, when applicable, systems presented herein may have both an asynchronous and synchronous configuration by clustering computing nodes by the type of configuration. This aspect may be implemented by grouping computing nodes having a similar computational power.

The technology proposed herein may be used to provide an optimal transport plan that allows to project any input distribution vector into the target distribution. By multiplying the input vector by the OT plan matrix, the source distribution can be mapped into the target distribution according to the optimal transport strategy encoded in P. Generating an optimal transportation plan matrix data object may be performed by scaling the global matrix data object with a matrix of which the diagonal is one global probability distribution vector, and a second matrix of which the diagonal is another global probability distribution vector.

From a practical implementation perspective, the proposed system for coordinated processing across a federated computer processing architecture using coordinated broadcast data messages between a plurality of computing nodes can be used for practical integration as an improved controller/supervisor/hypervisor for controlling operations of the plurality of computing nodes.

An example practical use case arises in respect especially where the plurality of computing nodes are geographically or geospatially distributed, and there are jurisdictional or other reasons as to why certain data cannot be shared or communicated as between each of the plurality of computing nodes. For example, there can be governmental or legal reasons such as to protect privacy or the leakage of sensitive information. However, a level of restricted coordination is still required. An example would be different computing nodes that are located at different trading venues around the world. Each of these computing nodes may be responsible for setting pricing and respect of bid and ask electronic signals that are made available for trade at the different trading venues.

These can be used for different types of securitized assets, for example. In the world of high-frequency trading and algorithmic trading, competing computer systems can identify minute differences in pricing as between one venue to another for a same or similar type of asset, and effectively obtain a risk-free arbitrage gain by racing to send data messages instructing transactions at one venue and then making a related transaction at another venue. In these situations, the proposed computer system described herein can be used to implement the sink hoard approach using the federated approach described herein, where, specific data messages corresponding only to updates are transferred as between each of the computing nodes in an iterative computing approach that specifically provides slices or portions of an overall computation data object for each of the local computers to compute.

The overall computation data object can be the transport plan described herein that is optimized by each of the updates. Accordingly, despite Frankfurt and New York computing nodes not sending direct pricing information to one another and only sending updates to update a coordinated data object, they are now able to each individually utilize the transport plan to set local pricing parameters through the provisioning of coordinated data messaging to specific venue execution servers.

In a next example use case, the cyber security ecosystem as between different computing nodes may be suspect or compromised, and the system is useful for providing a cyber security hardened multi-processor compute computing ecosystem. In this example, it is important for example, when sending sensitive information, to avoid man in the middle attacks where the communications are intercepted. By sending only updates where the underlying computations are done locally to the transport plan data object, even if a third party intercepts the communications or data messages as between different nodes, there is only very limited exposure that occurs as it may be practically difficult for the malicious third party to be able to decipher the updates. This is particularly useful, where computing nodes are updating based on sensitive information or customer information. In this example, instead of geospatially or geographically separate computing nodes, there can be different private computing nodes that interoperate together as described herein. These computing nodes do not even need to be on different computers, they can be walled off/segregated computing instances, such as virtual machines, or different segregated processors, or segregated processing operating in different user spaces, for example.

In another example use case, the system is instead utilized as a federated computer processing architecture that can be utilized for processing extremely large (storage-wise) or complex data structures. This can arise in practical situations, such as where there is an extremely large number of rows (e.g., 2 MM rows) or columns (e.g., 20K columns), or both, in a database and requires operation beyond the capability of a single computer's memory or compute resources. This can arise for extreme high dimensionality machine learning, for example, modelling complex phenomena, or simply an extremely large number of records being processed. The approach provided herein can split computing by slicing and portioning the main large data structure for distributed computing in a "divide and conquer" type approach. The "divide and conquer" type approach can be used to utilize the computing nodes to together solve the main large data structure and only pass updates back and forth between different computing nodes to reduce the overall data communication burden. The sliced portions can be computed locally, and a central computing node (in a centralized example) or a selected computing node among a plurality of nodes (in a decentralized example) may be responsible for re-assembling the completed calculated version taking into account all of the various updates on each iteration, for example. Accordingly, a computation that was not originally computationally feasible due to extreme data structure size beyond single computer limitations can now be computed as described herein. This is useful for solving otherwise intractable problems, which can arise in respect of highly computationally intensive solving approaches using a Sinkhorn approach based computation. By partitioning across multiple clients, the problem becomes capable of being solved.

In some embodiments, the system is a special-purpose machine that operates as a dedicated computing server or appliance that can reside within a data center, and can be coupled to other computing nodes by way of a messaging bus, where computational data messages are broadcast and sent from computing node to computing node, and can also couple with downstream and upstream computers that may be configured to provide inputs for local computing. In the geographically dispersed trading venue example, Frankfurt, London, New York may all have exchange venues with their own computing data centers. Each of these computing data centers can have their own execution engines and federated Sinkhorn computing nodes that are configured to receive messages from one another or broadcast to one another. There may be local computing resources local to each local data center that provide local data for the federated Sinkhorn computing node to conduct its computation on for the assigned slice of the overall large data object. When computing is complete, the slice update data object storing the relevant computations can be placed on a data buffer to be transmitted as part of a broadcast message to other computing nodes. The overall data object can, in some embodiments, be provided and generated either centrally or individually such that each of the data centers is able to compute what the optimal price, for example, for an asset should be, and send data messages to implement trading positions that can reduce the risk of an unintentional risk-free arbitrage situation from occurring.

As described herein, other variations are possible, such as different computing architectures and topologies, such as centralized, decentralized, synchronous, and asynchronous, and the combinations thereof. Each has different technical benefits and drawbacks as noted herein—centralized approaches require one node to be assigned as a leader, while decentralized approaches require more coordination.

Synchronous approaches are less likely to have divergence issues and more likely to converge, but are limited by the pace of the slowest computing node or slowest communication connection.

Asynchronous approaches (e.g., with limited or only periodic synchronization) can utilize all available computing resources, but can fall out of synchronization or begin diverging from other computing nodes, propagating errors. Asynchronous approaches proposed herein are particularly useful where there is a divergence of technical capabilities of each of the computing nodes to avoid being slowed down by the weakest link, or to take advantage of higher capabilities of certain high-performing computing nodes, such as a supercomputing cluster.

In further embodiments, one or more controller devices are utilized to track performance metrics associated with computing operation of the federated computing nodes, and adjust performance parameters based on desired balances between accuracy and performance, or based on monitored computing performance. Accordingly, the controller devices can shift the balance between synchronous and asynchronous (e.g., for every 5 iterative asynchronous updates, one all to all synchronization), etc.

As described herein, approaches are proposed that provide practical implementations that are adapted to solving of the discrete optimal transport (OT) problem with entropy regularization in a proposed federated learning computing environment.

The Sinkhorn approach transforms the classical OT linear program into strongly convex constrained optimization, facilitating first order methods for otherwise intractably large problems. Scaling up the problem further as described herein can include distributed datasets, either from clients whose privacy is a concern, or due to processing and memory hardware limitations. In this document, there is described herein proposed implementations of the Federated Sinkhorn for controlling distributed environments where data is partitioned across multiple clients. The problem is framed as minimizing the transport cost with an entropy regularization term, subject to marginal constraints, where block components of the source and target distribution vectors are distributed among clients. Both synchronous and asynchronous variants are considered as well as all-to-all and server-client communication topology protocols. Each procedure allows clients to compute local operations on their data partition while periodically exchanging information with others. There can be theoretical guarantees on convergence for the different variants under different possible conditions. As described herein, Applicants have empirically demonstrated the algorithms' performance on synthetic datasets and a real-world financial risk assessment application. The investigation highlights the technical tradeoffs associated with computation and communication time and how good quality parallel speedup can be ensured or not as depending on problem size and sparsity.

The embodiments of the devices, systems, and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other types of computer servers in a manner to fulfill described roles, responsibilities, or functions.

The functional blocks and modules described herein (e.g., the functional blocks and modules in FIG. 1) may comprise processors, electronics devices, hardware devices, electronics components, logical circuits, memories, software codes, firmware codes, etc., or a combination thereof. In addition, features discussed herein relating to FIG. 1 may be implemented via specialized processor circuitry, via executable instructions, and/or combinations thereof.

As used herein, various terminology is for describing particular implementations only and is not intended to be limiting of implementations. For example, as used herein, an ordinal term (e.g., "first," "second," "third," etc.) used to modify an element, such as a structure, a component, an operation, etc., does not by itself indicate a priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified—and includes what is specified; e.g., substantially 90 degrees includes 90 degrees and substantially parallel includes parallel—as understood by a person of ordinary skill in the art. In an embodiment, the term "substantially" may be substituted with "within [a percentage] of" what is specified, where the percentage includes 0.1, 1, 5, and 10 percent; and the term "approximately" may be substituted with "within 10 percent of" what is specified. The phrase "and/or" means and or. To illustrate, A, B, and/or C includes: A alone, B alone, C alone, a combination of A and B, a combination of A and C, a combination of B and C, or a combination of A, B, and C. In other words, "and/or" operates as an inclusive or. Additionally, the phrase "A, B, C, or a combination thereof" or "A, B, C, or a combination thereof" includes: A alone, B alone, C alone, a combination of A and B, a combination of A and C, a combination of B and C, or a combination of A, B, and C.

The terms "comprise" and other form thereof such as "comprises" and "comprising," "have" and other form thereof such as "has" and "having," and "include" and other form thereof such as "includes" and "including" are open-ended linking verbs. As a result, an apparatus that "comprises," "has," or "includes" one or more elements possesses those one or more elements, but is not limited to possessing only those elements. Likewise, a method that "comprises," "has," or "includes" one or more steps possesses those one or more steps, but is not limited to possessing only those one or more steps.

The implementation of the apparatuses, systems, and methods can consist of or consist essentially of—rather than comprise/include/have—the described steps, elements, and/or features. Thus, in the claims, the term "consisting of" or "consisting essentially of" can be substituted for the open-ended linking verbs recited above, in order to change the scope of a given claim from what it would otherwise be using the open-ended linking verb. Additionally, it will be understood that the term "wherein" may be used interchangeably with "where."

Further, a device or system that is configured in a certain way is configured in at least that way, but it can also be configured in other ways than those specifically described. Aspects of one example may be applied to other examples, even though not described or illustrated, unless expressly prohibited by this disclosure or the nature of a particular example.

Those of skill would further appreciate that the various illustrative logical blocks, modules, circuits, and algorithm steps (e.g., the logical blocks in FIG. 1 and FIGS. 2A-2B) described in connection with the disclosure herein may be implemented as electronic hardware, computer software, or combinations of both. To clearly illustrate this interchangeability of hardware and software, various illustrative components, blocks, modules, circuits, and steps have been described above in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a processor, a digital signal processor (DSP), an ASIC), a field programmable gate array (FPGA) or other programmable logic device, discrete gate or transistor logic, discrete hardware components, or combinations thereof designed to perform the functions described herein. A processor may be a microprocessor, but in the alternative, the processor may be another form of processor, controller, microcontroller, or state machine. A processor may also be implemented as a combination of computing devices, e.g., a combination of a DSP and a microprocessor, a plurality of microprocessors, one or more microprocessors in conjunction with a DSP core, or other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or a combination thereof. If implemented in software, the functions may be stored on or transmitted over as one or more instructions or code on a computer-readable medium. Computer-readable media includes both computer storage media and communication media including a medium that facilitates transfer of a computer program from one place to another. Computer-readable storage media may be a media that can be accessed by a computer. By way of example, and not limitation, such computer-readable media can comprise RAM, ROM, EEPROM, CD-ROM or other optical disk storage, magnetic disk storage or other magnetic storage devices, or other medium that can be used to carry or store desired program code means in the form of instructions or data structures and that can be accessed by a computer, or a processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

The above specification and examples provide a complete description of the structure and use of illustrative implementations. Although certain examples have been described above with a certain degree of particularity, or with reference to one or more individual examples, those skilled in the art could make numerous alterations to the disclosed implementations without departing from the scope of this invention. As such, the various illustrative implementations of the methods and systems are not intended to be limited to the particular forms disclosed. Rather, they include all modifications and alternatives falling within the scope of the claims, and examples other than the one shown may include some or all of the features of the depicted example. For example, elements may be omitted or combined as a unitary structure, and/or connections may be substituted. Further, where appropriate, aspects of the examples described above may be combined with aspects of the other examples described to form further examples having comparable or different properties and/or functions, and addressing the same or different problems. Similarly, it will be understood that the benefits and advantages described above may relate to one embodiment or may relate to several implementations.

The claims are not intended to include, and should not be interpreted to include, means plus- or step-plus-function limitations, unless such a limitation is explicitly recited in a given claim using the phrase(s) "means for" or "step for," respectively.

Although the aspects of the present disclosure and their advantages have been described in detail, it should be understood that various changes, substitutions and alterations can be made herein without departing from the spirit of the disclosure as defined by the appended claims. Moreover, the scope of the present application is not intended to be limited to the particular implementations of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A decentralized system for coordinated processing across a federated computer processing architecture using coordinated broadcast data messages between a plurality of computing nodes, the system comprising:

the plurality of computing nodes connected via at least one communications network, the plurality of computing nodes being configured for electronic communication over the communication network, each computing node having a computer processor, operating in conjunction with a computer memory and non-transitory computer readable storage media, the computer memory storing a pair of local probability distribution vectors representative of local data and a shared matrix data object representative of an assigned portion of a global matrix data object, each computing node of the plurality of computing nodes configured to process a method for generating an optimal transportation matrix data object, the method comprising:

initialize a portion of a first global probability distribution vector, the portion having a size corresponding to the size of the local probability distribution vectors;

generate a first local updated probability distribution vector by normalizing one of the local probability distribution vectors with a product of the shared matrix data object and the portion of the first global probability distribution vector;

broadcast, via the communication network, the first local updated probability distribution vector to the other computing nodes;

receive, via the communication network, a plurality of first shared updated probability distribution vectors from the other computing nodes;

generate a second global probability distribution vector by concatenating the generated first local updated probability distribution vector and the received first shared updated probability distribution vectors;

initialize a portion of the second global probability distribution vector, the portion of the second global probability distribution vector having a size corresponding to the size of the local probability distribution vectors;

generate a second local updated probability distribution vector by normalizing the other one of the local probability distribution vector with a product of a transpose of the shared matrix data object and the portion of the second global probability distribution vector;

broadcast, via the communication network, the second local updated probability distribution vector to the other computing nodes;

receive, via the communication network, a plurality of second shared updated probability distribution vectors from the other computing nodes;

generate a third global probability distribution vector by concatenating the generated second local updated probability distribution vector and the received second shared updated probability distribution vectors;

generate the optimal transportation matrix data object by scaling the global matrix data object with a first matrix data object of which the diagonal is the second global probability distribution vector and a second matrix data object of which the diagonal is third second global probability distribution vector; and provide the optimal transportation matrix data object to the other computing nodes.

2. The system of claim 1, wherein each computing node is further configured, in a previous iteration, to receive, via the communication network and from at least one other computing node, a previously updated probability distribution vector and to generate the first global probability distribution vector by concatenating the received previously updated probability distribution vectors.

3. The system of claim 2, wherein prior to said providing each other computing nodes with the portion of the first global probability distribution vector, each computing node is further configured to hold until the previously updated probability distribution vector is obtained from each other computation node.

4. The system of claim 2, wherein each computing node is further configured to provide a given computing with the portion of the first global probability vector upon a reception of a previously updated probability distribution vector from the given computing node.

5. The system of claim 1, wherein each computing node is configured to iteratively reprocess the method for generating the optimal transportation matrix data object using the third global probability distribution vector as the first global probability distribution vector until the optimal transportation matrix data object has a marginal value is inferior to a predetermined threshold.

6. The system of claim 5, wherein each computing node is further configured to normalize the global matrix data object with an entropy regularization term, the entropy regularization term selected to improve a convergence of the marginal value of the optimal transportation matrix data object towards the predetermined threshold.

7. The system of claim 1, wherein each computing node is configured, upon reception of the optimal transportation matrix data object to combine one of the local probability distribution vectors with optimal transportation matrix data object to retrieve an optimized distribution vector.

8. The system of claim 1, wherein each computing node has stored thereon a plurality of local probability distribution vectors to be processed for generating the optimal transportation matrix data object.

9. The system of claim 1, wherein the computer processor of each computing node include a combination of both central processing units and graphics processing units, further wherein the plurality of computing nodes are networked distributed computing resources that are selected and provisioned for usage based at least on the generation of the optimal transportation matrix data object by distributing the computation load across the plurality of computing nodes.

10. The system of claim 1, wherein said initializing the portion of the first global probability vector includes slicing the first global probability vector to obtain the portion of the first global probability vector, further wherein said initializing the portion of the second global probability vector includes slicing the second global probability vector to obtain the portion of the second global probability vector.

11. A centralized system for coordinated processing across a federated computer processing architecture using coordinated broadcast data messages between a plurality of computing nodes, the system comprising:

a server computer configured for electrical connection and communication via at least one communications network, the server computer having computer memory storing a global matrix data object and a first global probability distribution vector; and the plurality of computing nodes connected via the at least one communications network, the plurality of computing nodes being configured for electronic communication over the communication network, each computing node having a computer processor, operating in conjunction with a computer memory and non-transitory computer readable storage media, the computer memory storing a pair of local probability distribution vectors representative of local data, the server computer configured to process a method for generating an optimal transportation matrix data object, the method comprising:

providing, via the communication network, each computing node with a first product vector representative of a product between the first global probability distribution vector and the global matrix data object, the product vector having a size corresponding to the size of the local probability distribution vectors;

receiving, via the communication network and from each computing node, a first updated probability distribution vector, wherein each first updated probability distribution vector is generated by a respective computing node by normalizing one of the local probability distribution vectors with the first product vector;

generating a second global probability distribution vector by concatenating the received first updated probability distribution vectors;

providing, via the communication network, each computing node with a second product vector representative of the second global probability distribution vector being multiplied with the global matrix data object;

receiving, via the communication network and from each computing node, a second updated probability distribution vector, wherein each second updated probability distribution vector is generated by a respective computing node by normalizing the other one of the local probability distribution vector with the second product vector;

generating a third global probability distribution vector by concatenating the received second updated probability distribution vectors;

generating the optimal transportation matrix data object by scaling the global matrix data object with a first matrix data object of which the diagonal is the second global probability distribution vector and a second matrix data object of which the diagonal of the third global probability distribution vector; and providing the optimal transportation matrix data object to each computing node.

12. The system of claim 11, wherein the server is further configured, in a previous iteration, to receive, via the communication network and from at least one computing node, a previously updated probability distribution vector and to generate the first global probability distribution vector by concatenating the received previously updated probability distribution vectors.

13. The system of claim 12, wherein prior to said providing each computing node with the first product vector, the server is further configured to hold until the previously updated probability distribution vector is obtained from each computation node.

14. The system of claim 11, wherein the server is configured to iteratively reprocess the method for generating the optimal transportation matrix data object using the third global probability distribution vector as the first global probability distribution vector until the optimal transportation matrix data object has a marginal value is inferior to a predetermined threshold.

15. The system of claim 14, wherein the server is further configured to normalize the global matrix data object with an entropy regularization term, the entropy regularization term selected to improve a convergence of the marginal value of the optimal transportation matrix data object towards the predetermined threshold.

16. The system of claim 11, wherein each first product vector is obtained, by each computing node, as a result of the server performing the steps of:

receiving, from each computing node, a previously updated probability distribution vector;

concatenating the updated probability distribution vectors to obtain the first global probability distribution vector;

multiplying the first global probability distribution vector with the global matrix data object, thereby obtaining a first intermediate global vector; and scattering the first intermediate global vector amongst each computing node.

17. The system of claim 11, wherein each node is configured, upon reception of the optimal transportation matrix data object, to combine one of the local probability distribution vectors with optimal transportation matrix data object to retrieve an optimized distribution vector.

18. The system of claim 11, wherein each node has stored thereon a plurality of local probability distribution vectors to be processed for generating the optimal transportation matrix data object.

19. The system of claim 11, wherein the computer processor of each computing node include a combination of both central processing units and graphics processing units, further wherein the plurality of computing nodes are networked distributed computing resources that are selected and provisioned for usage based at least on the generation of the optimal transportation matrix data object by distributing the computation load across the plurality of computing nodes.

20. A non-transitory computer readable medium storing machine interpretable instruction sets, which when executed by a processor, cause the processor to perform steps of a method for coordinated broadcast data messaging, the method comprising:

providing, via a communication network, each computing node of a plurality of computing nodes with a first product vector representative of a portion of a product between a global probability distribution vector and a global matrix data object, the product vector having a size corresponding to the size of local probability distribution vectors stored in each respective computing node;

receiving, via the communication network and from each computing node, a first updated probability distribution vector, wherein each first updated probability distribution vector is generated by a respective computing node by normalizing one of the local probability distribution vectors with the first product vector;

generating a second global probability distribution vector by concatenating the received first updated probability distribution vectors;

providing, via the communication network, each computing node with a second product vector representative of a portion of the second global probability distribution vector being multiplied with the global matrix data object;

receiving, via the communication network and from each computing node, a second updated probability distribution vector, wherein each second updated probability distribution vector is generated by a respective computing node by normalizing the other one of the local probability distribution vector with the second product vector;

generating a third global probability distribution vector by concatenating the received second updated probability distribution vectors;

generating the optimal transportation matrix data object by scaling the global matrix data object with a first matrix data object of which the diagonal is the second global probability distribution vector and a second matrix data object of which the diagonal of the third global probability distribution vector; and providing the optimal transportation matrix data object to each computing node.

* * * * *